US011228401B2

(12) United States Patent
Wang et al.

(10) Patent No.: US 11,228,401 B2
(45) Date of Patent: Jan. 18, 2022

(54) SYSTEMS AND METHODS FOR SMART HARQ FOR WIFI

(71) Applicant: InterDigital Patent Holdings, Inc., Wilmington, DE (US)

(72) Inventors: Xiaofei Wang, Cedar Grove, NJ (US); Guodong Zhang, Woodbury, NY (US); Robert L. Olesen, Huntington, NY (US); Hanqing Lou, Syosset, NY (US); Monisha Ghosh, Chicago, IL (US); Pengfei Xia, San Diego, CA (US); Nirav B. Shah, San Diego, CA (US); Oghenekome Oteri, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 38 days.

(21) Appl. No.: 16/713,795

(22) Filed: Dec. 13, 2019

(65) Prior Publication Data
US 2020/0119859 A1 Apr. 16, 2020

Related U.S. Application Data

(63) Continuation of application No. 14/903,620, filed as application No. PCT/US2014/046274 on Jul. 11, 2014, now abandoned.
(Continued)

(51) Int. Cl.
*H04L 1/18* (2006.01)
*H04L 1/00* (2006.01)
(Continued)

(52) U.S. Cl.
CPC .......... *H04L 1/1819* (2013.01); *H04L 1/0057* (2013.01); *H04L 1/0618* (2013.01);
(Continued)

(58) Field of Classification Search
CPC ..... H04L 1/188; H04L 1/0057; H04L 1/0618; H04L 1/1664; H04L 1/1614;
(Continued)

(56) References Cited

U.S. PATENT DOCUMENTS 8,730,853 B2   5/2014  Lee et al.
8,842,602 B2   9/2014  Koo et al.
(Continued)

OTHER PUBLICATIONS

Aboul-Magd et al., "Usage Models for Next Generation Wi-Fi", IEEE 802.11-13/0313r0, Mar. 2013, 26 pages.
(Continued)

*Primary Examiner* — Marsha D Banks Harold
*Assistant Examiner* — Dharmesh J Patel
(74) *Attorney, Agent, or Firm* — Volpe Koenig

(57) ABSTRACT

Systems, methods, and instrumentalities are provided to implement a method of communicating a feedback in a wireless local area network (WLAN). A WLAN device may receive a data frame with a hybrid automatic repeat request (HARQ) data indicator in a frame header. The WLAN device may send an acknowledgement frame when the data frame is correctly received and decoded. The WLAN device may send a negative acknowledgement frame when the data frame is not correctly received and decoded.

16 Claims, 15 Drawing Sheets

Related U.S. Application Data

(60) Provisional application No. 61/845,101, filed on Jul. 11, 2013, provisional application No. 61/845,092, filed on Jul. 11, 2013.

(51) Int. Cl.
*H04L 1/06* (2006.01)
*H04L 1/16* (2006.01)
*H04W 84/12* (2009.01)

(52) U.S. Cl.
CPC .......... *H04L 1/1614* (2013.01); *H04L 1/1664* (2013.01); *H04L 1/188* (2013.01); *H04L 1/1864* (2013.01); *H04L 1/1822* (2013.01); *H04W 84/12* (2013.01)

(58) Field of Classification Search
CPC ... H04L 1/1822; H04L 1/1819; H04L 1/1864; H04L 1/1607; H04L 1/0036; H04L 1/0026; H04L 1/1854; H04L 1/0025; H04L 1/0027; H04W 84/12; H04B 17/318

See application file for complete search history.

(56) References Cited

U.S. PATENT DOCUMENTS

| | | | |
|---|---|---|---|
| 9,271,290 | B2 | 2/2016 | Pelletier et al. |
| 9,419,740 | B2 | 8/2016 | Koo et al. |
| 2005/0238054 | A1 | 10/2005 | Sharma |
| 2006/0268881 | A1 | 11/2006 | Moreton |
| 2009/0031185 | A1 | 1/2009 | Xhafa et al. |
| 2009/0046650 | A1* | 2/2009 | Dalsgaard ............ H04L 1/1819 370/329 |
| 2009/0086657 | A1 | 4/2009 | Alpert et al. |
| 2012/0207109 | A1* | 8/2012 | Pajukoski ............ H04L 1/0029 370/329 |
| 2012/0269183 | A1* | 10/2012 | Sohn .................... H04L 1/0026 370/338 |
| 2014/0293868 | A1 | 10/2014 | Levanen |

OTHER PUBLICATIONS

Cariou et al., "High-Efficiency WLAN Straw Poll", IEEE 802.11-13/0339r10, Mar. 19, 2013, 7 pages.

IEEE P802.11ac/D5.0, Draft Standard for Information Technology—Telecommunications and information exchange between systems—Local and metropolitan area networks—Specific requirements; Part 11: Wireless LAN Medium Access Control (MAC) and Physical Layer (PHY) specifications, Amendment 4: Enhancements for Very High Throughput for Operation in Bands below 6 GHz, IEEE P802.11ac/D5.0 (Jan. 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE, "Draft Standard for Information technology—Telecommunications and Information Exchange Between Systems Local and Metropolitan Area Networks—Specific Requirements, Part 11: Wireless LAN Medium Access Control (MAC) and Physical Layer (PHY) Specifications, Amendment 6: Sub 1 GHz License Exempt Operation", IEEE P802.11ah™/00.1, May 2013.

IEEE, "Part 11: Wireless LAN Medium Access Control (MAC) and Physical Layer (PHY) Specifications", IEEE Std 802.11™-2012, IEEE Computer Society, Mar. 29, 2012, 2793 pages.

Inoue et al., "Beyond 802.11ac—A Very High Capacity WLAN," IEEE 11-13/0287r3 (Mar. 19, 2013).

Pirskanen, "On Future Enhancements to 802.11 Technology", IEEE 802.11-13/0314r0, Mar. 2013, 14 pages.

Third Generation Partnership Project, "Technical Specification Group Radio Access Network; Evolved Universal Terrestrial Radio Access (E-UTRA); Physical channels and modulation (Release 12)," 3GPP TS 36.211 V12.2.0 (Jun. 2014).

Third Generation Partnership Project, "Technical Specification Group Radio Access Network; Evolved Universal Terrestrial Radio Access (E-UTRA); Physical Channels and Modulation (Release 11)," 3GPP TS 36.211 V11.3.0 (Jun. 2013).

Third Generation Partnership Project, "Technical Specification Group Radio Access Network; Evolved Universal Terrestrial Radio Access (E-UTRA); Physical Channels and Modulation (Release 10)," 3GPP TS 36.211 V10.6.0 (Dec. 2012).

Third Generation Partnership Project, "Technical Specification Group Radio Access Network; Evolved Universal Terrestrial Radio Access (E-UTRA); Physical Channels and Modulation (Release 11)," 3GPP TS 36.211 V11.5.0 (Dec. 2013).

Third Generation Partnership Project, "Technical Specification Group Radio Access Network; Evolved Universal Terrestrial Radio Access (E-UTRA); Multiplexing and channel coding (Release 11)," 3GPP TS 36.212 V11.3.0 (Jun. 2013).

Third Generation Partnership Project, "Technical Specification Group Radio Access Network; Evolved Universal Terrestrial Radio Access (E-UTRA); Multiplexing and channel coding (Release 11)," 3GPP TS 36.212 V11.5.0 (Jun. 2014).

Third Generation Partnership Project, "Technical Specification Group Radio Access Network; Evolved Universal Terrestrial Radio Access (E-UTRA); Multiplexing and channel coding (Release 12)," 3GPP TS 36.212 V12.1.0 (Jun. 2014).

Xiao, "Concatenation and Piggyback Mechanisms for the IEEE 802.11 MAC", Wireless Communications and Networking Conference, IEEE, vol. 3, Mar. 21, 2004, pp. 1642-1647.

\* cited by examiner

| Element ID | Length | HARQ Capabilities | HARQ Mode | Retry MCS Mode | RV Modes | Concurrent HARQ Process | HARQ Coding |

FIG. 2

| Element ID | Length | HARQ Type Used | HARQ Mode | Retry MCS Mode | RV Modes | Concurrent HARQ Process | HARQ Coding |

FIG. 3

| Frame Control | Duration | RA | HARQ Info | FCS |

May contain extension field to indicate it is an NACK frame in addition to/instead of Type and Subtype field

FIG. 4

| Multi-TID Subfield Value | Compressed Bitmap Subfield Value | BlockACK Frame Variant |
|---|---|---|
| 1 | 0 | NACK |

FIG. 6

STBC mapping with odd number of HARQ transmissions

| $N_{STS}$ | $N_{SS}$ | $i_{STS}$ | $\tilde{d}_{k,iSTS,2m,0}$ | $\tilde{d}_{k,iSTS,2m+1,0}$ |
|---|---|---|---|---|
| 2 | 1 | 1 | $d_{k,1,2m,0}$ | $d_{k,1,2m+1,0}$ |
|   |   | 2 | $-d^{*}_{k,1,2m+1,0}$ | $d^{*}_{k,1,2m,0}$ |

STBC mapping with even number of HARQ transmissions

| $N_{STS}$ | $N_{SS}$ | $i_{STS}$ | $\tilde{d}_{k,iSTS,2m,0}$ | $\tilde{d}_{k,iSTS,2m+1,0}$ |
|---|---|---|---|---|
| 2 | 1 | 1 | $d_{k,1,2m,0}$ | $-d^{*}_{k,1,2m+1,0}$ |
|   |   | 2 | $d_{k,1,2m+1,0}$ | $d^{*}_{k,1,2m,0}$ |

FIG. 13

SYSTEMS AND METHODS FOR SMART HARQ FOR WIFI

CROSS-REFERENCE TO RELATED APPLICATIONS

This application is a continuation of U.S. patent application Ser. No. 14/903,620, filed Jan. 8, 2016, which is a 371 application of International Application No. PCT/US14/46274, filed Jul. 11, 2014, which claims the benefit of U.S. Provisional Patent Application No. 61/845,092, filed on Jul. 11, 2013 and U.S. Provisional Patent Application No. 61/845,101, filed on Jul. 11, 2013, the disclosures of which are hereby incorporated by reference in their entirety.

BACKGROUND

WiFi enabled devices, e.g., laptop computers, tablet computers, personal digital assistant devices, mobile or cellular phones, smart television sets, set top boxes, personal media players, etc., that may communicate using WiFi signals are becoming increasingly popular. Several emerging WiFi communications standards (e.g., 802.11ac, 802.11ad, etc.) have been developed and are being developed for facilitating communication of such WiFi enabled devices in a Wireless Local Area Network (WLAN). The error control mechanisms provided by the available WiFi communication standards may be inadequate.

SUMMARY

Systems, methods, and instrumentalities associated with data transmissions are disclosed. Devices, such as 802.11 devices, may be configured to use ACK/NACK information relating to data transmissions. Such data transmissions may be part of an 802.11 exchange (e.g., a speed frame exchange, a bi-directional TXOP, etc.). A first station (STA) may receive a first transmission from a second STA. The first transmission may comprise first data. The first STA may determine whether or not the first data was received correctly and send a second transmission to the second STA that includes combined information that may comprise its own data and an ACK/NACK indication associated with the first data. For example, the combined information may be a packet that includes a data part (e.g., second data) and an ACK/NACK part associated with the first data. When the first STA determines that the first data was received correctly, the combined information comprises the data part and an ACK. When the first STA determines that the first data was not received correctly, the combined information comprises the data part and a NACK. In the case of a NACK, the combined information may include a frame comprising a type field and a subtype field. A value of the type field and/or a value of the subtype field may be set to indicate the NACK.

Data transmissions by stations may include an indication of how many times data has been sent. For example, if data is being sent for the first time, the indication may indicate an initial transmission (e.g., TX1). If data is being sent for a second time (e.g., there was a NACK associated with the first sending, no HARQ feedback received relating to the first sending, etc.), the indication may indicate that it is the second time the data is being sent (e.g., TX2). After data is sent a first time, a redundancy version(s) may subsequently be used when sending the data.

A fault recovery operation may be used in combination with HARQ. A station may send data (e.g., a data packet, a combined data/ACK/NACK packet, etc.). A counter associated with the data (e.g., and associated HARQ process) may be started. When an ACK or NACK has not been received before the counter expires, the station may retransmit the sent data. For example, the station may resend the data transmission (e.g., if the transmission was the first transmission, the first transmission may be resent; if the transmission was a subsequent transmission where a redundancy version was sent, the redundancy version may be resent, or different redundancy version may be sent; etc.).

BRIEF DESCRIPTION OF THE DRAWINGS

FIG. 2 depicts an exemplary Hybrid Automatic Repeat reQuest (HARQ) capability Information Element (IE).

FIG. 3 depicts an exemplary HARQ Operation IE.

FIG. 4 depicts an exemplary negative acknowledgement (NACK) frame.

FIG. 6 depicts an exemplary BA Control Field setting to indicate a NACK frame.

FIG. 13 depicts an exemplary Space Time Block Coding (STBC) mapping for HARQ transmissions.

DETAILED DESCRIPTION

A detailed description of illustrative embodiments will now be described with reference to the various figures. Although this description provides a detailed example of possible implementations, it should be noted that the details are intended to be exemplary and in no way limit the scope of the application.

Figure 1A:
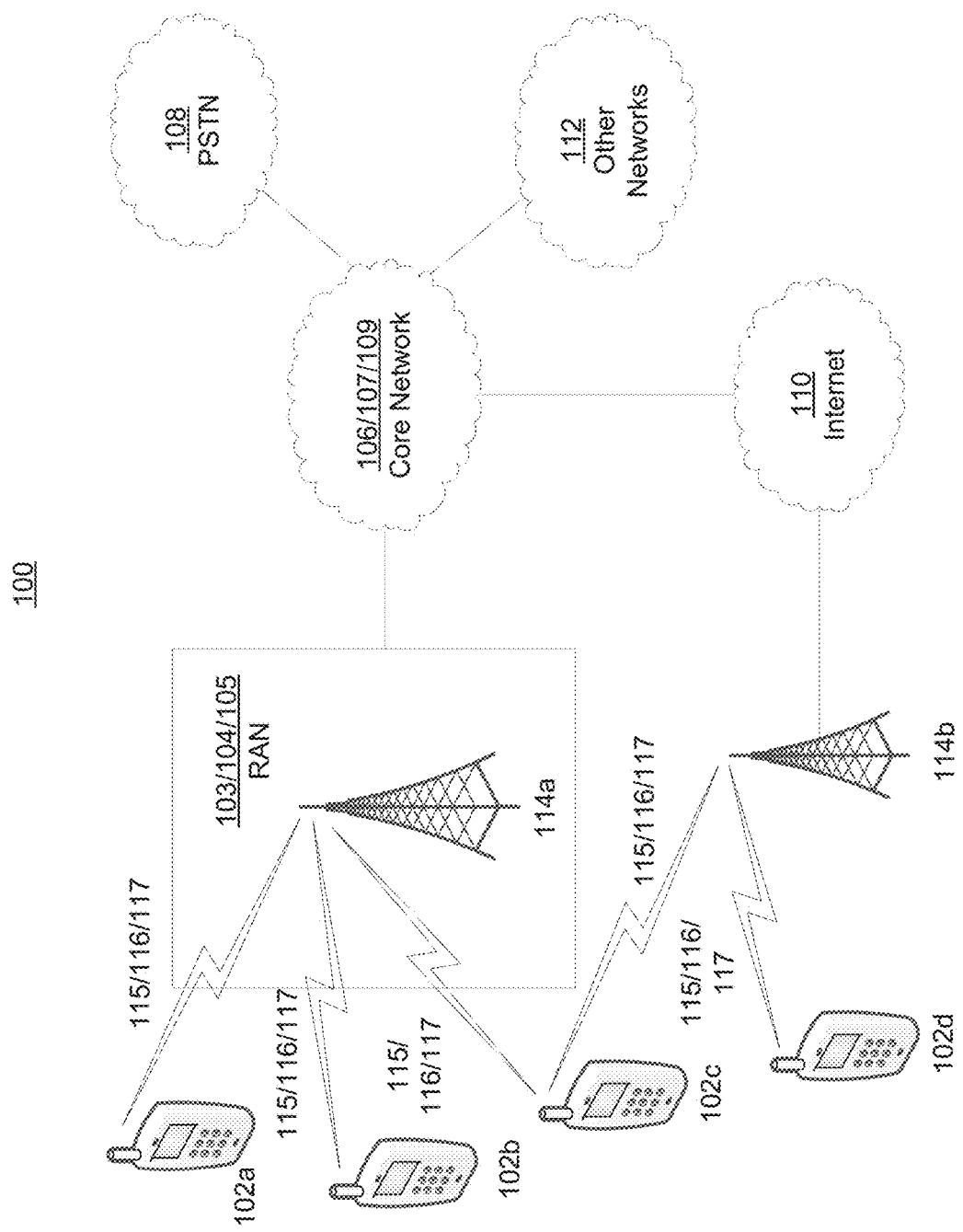
FIG. 1A depicts an exemplary communications system.

FIG. 1A is a diagram of an example communications system 100 in which one or more disclosed features may be implemented. For example, a wireless network (e.g., a wireless network comprising one or more components of the communications system 100) may be configured such that bearers that extend beyond the wireless network (e.g., beyond a walled garden associated with the wireless network) may be assigned QoS characteristics.

The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include at least one wireless transmit/receive unit (WTRU), such as a plurality of WTRUs, for instance WTRUs 102a, 102b, 102c, and 102d, a radio access network (RAN) 104, a core network 106, a public switched telephone network (PSTN) 108, the Internet 110, and other networks 112, though it should be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it should be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like.

For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it should be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
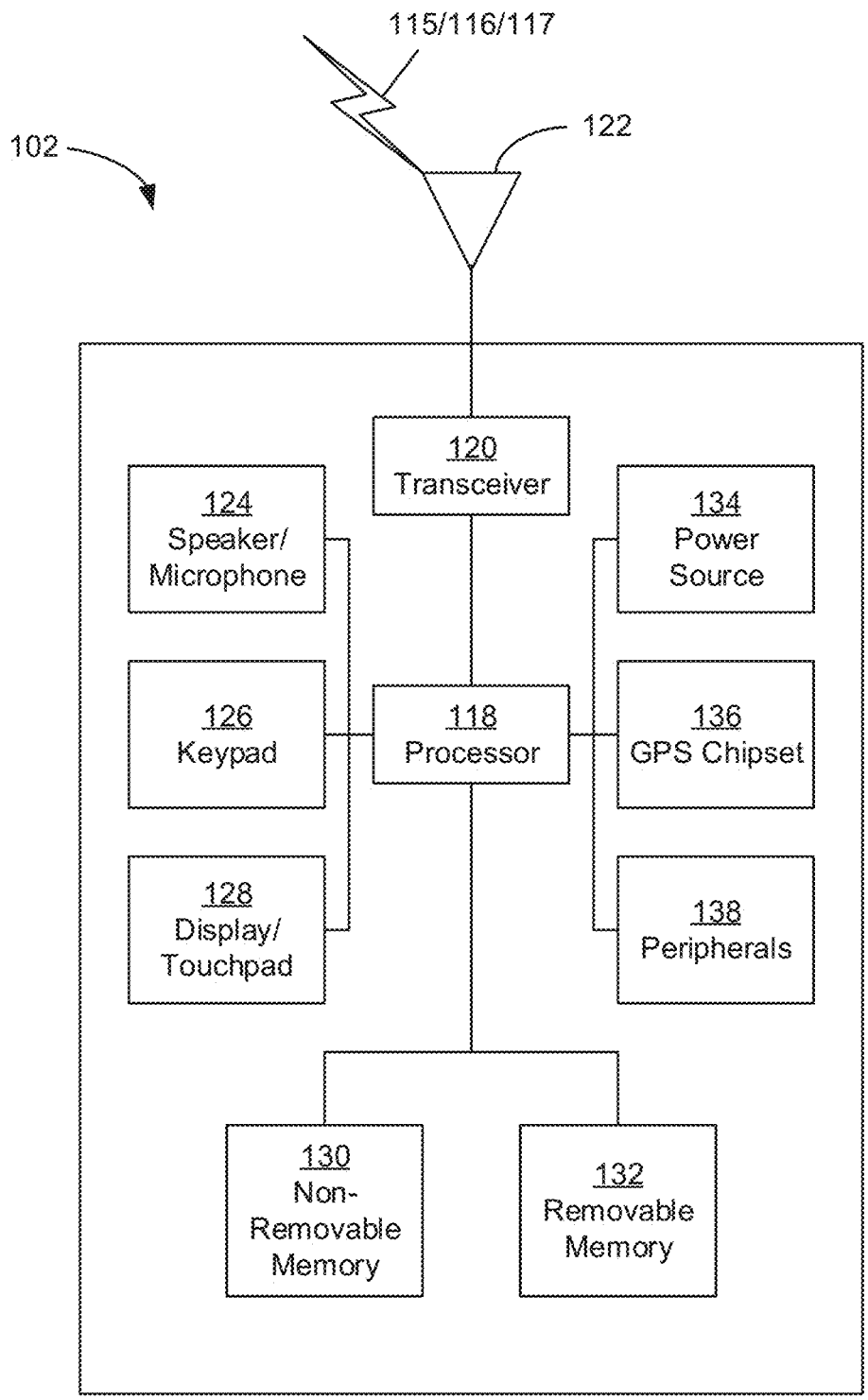
FIG. 1B depicts an exemplary wireless transmit/receive unit (WTRU).

FIG. 1B depicts an exemplary wireless transmit/receive unit, WTRU 102. WTRU 102 may be used in one or more of the communications systems described herein. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It should be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it should be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It should be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It should be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
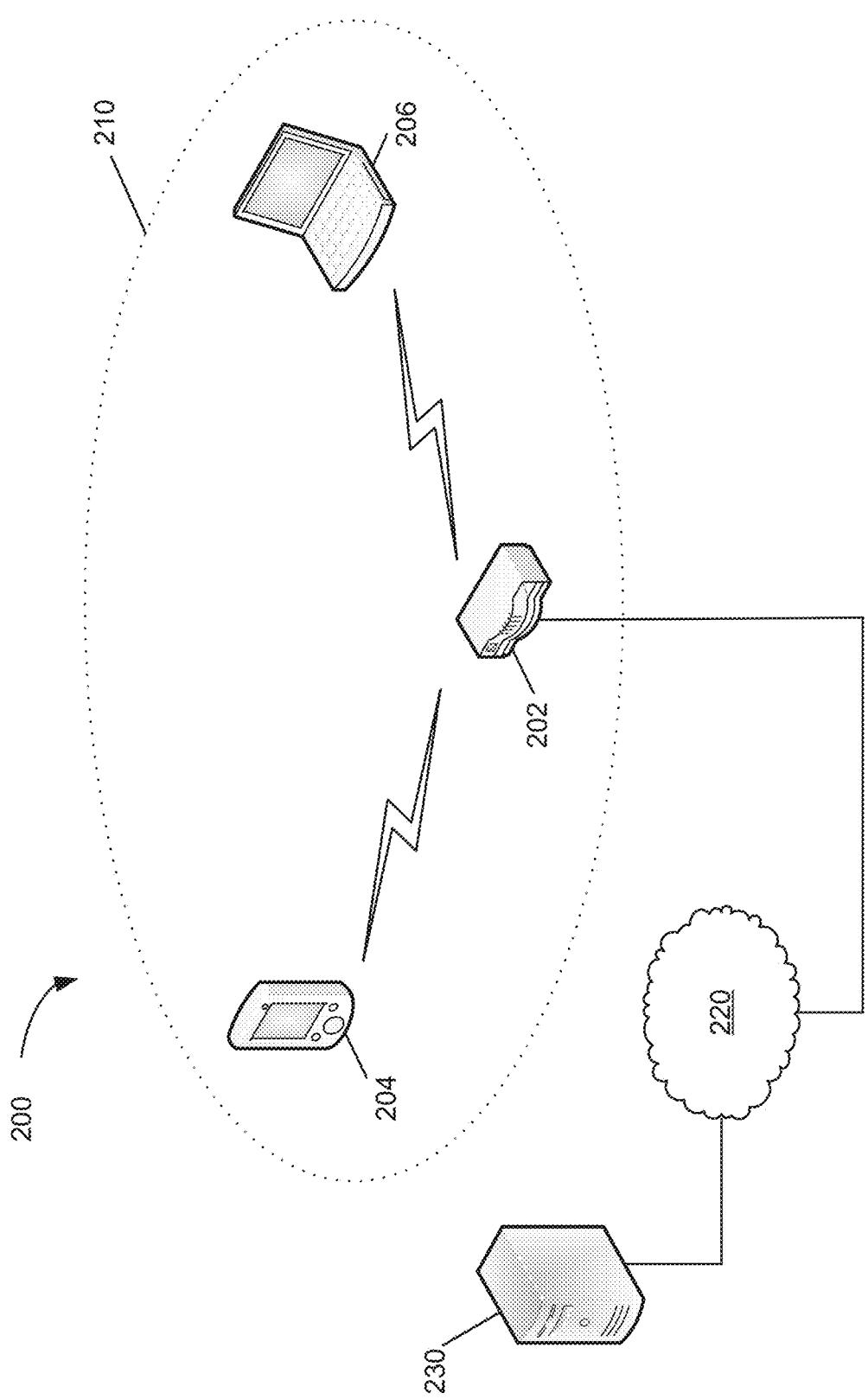
FIG. 1C depicts exemplary wireless local area network (WLAN) devices.

FIG. 1C depicts exemplary WLAN devices, one or more of which may be used to implement one or more of the features described herein, operating in a WLAN system 200. The WLAN system 200 may be configured to implement one or more protocols of the IEEE 802.11 communication standard, which may include a channel access scheme, such as DSSS, OFDM, OFDMA, etc. A WLAN may operate in a mode, e.g., an infrastructure mode, an ad-hoc mode, etc.

The WLAN system 200 may include, but is not limited to, an access point (AP) 202, a station (STA) 204, and STA 206. The STA 204 and STA 206 may be associated with the AP 202. A WLAN operating in an infrastructure mode may comprise one or more APs communicating with one or more associated STAs. An AP and STA(s) associated with the AP may comprise a basic service set (BSS). For example, AP 202, STA 204, and STA 206 may comprise BSS 210. An extended service set (ESS) may comprise one or more APs (with one or more BSSs) and STA(s) associated with the APs.

An AP may have access to, and/or interface to, a distribution system (DS), which may be wired and/or wireless and may carry traffic to and/or from the AP. Traffic to a STA in the WLAN originating from outside the WLAN may be received at an AP in the WLAN, which may send the traffic to the STA in the WLAN. Traffic originating from a STA in the WLAN to a destination outside the WLAN may be sent to an AP in the WLAN, which may send the traffic to the destination.

As depicted, the AP 202 is in communication with a network 220. The network 220 is in communication with a server 230. Traffic between STAs within the WLAN may be sent through one or more APs. For example, a source STA (e.g., STA 206) may have traffic intended for a destination STA (e.g., STA 204). STA 206 may send the traffic to AP 202, and, AP 202 may send the traffic to STA 204.

A WLAN may operate in an ad-hoc mode. The ad-hoc mode WLAN may be referred to as independent BSS. In an ad-hoc mode WLAN, the STAs may communicate directly with each other (e.g., STA 204 may communicate with STA 206 without such communication being routed through an AP).

IEEE 802.11 devices (e.g., IEEE 802.11 APs in a BSS) may use beacon frames to announce the existence of a WLAN network. An AP, such as AP 202, may transmit a beacon on a channel, e.g., a fixed channel, such as a primary channel. A STA may use a channel, such as the primary channel, to establish a connection with an AP.

STA(s) and/or AP(s) may use a Carrier Sense Multiple Access with Collision Avoidance (CSMA/CA) channel access mechanism. In CSMA/CA, a STA and/or an AP may sense the primary channel. For example, if a STA has data to send, the STA may sense the primary channel. If the primary channel is detected to be busy, the STA may back off. For example, a WLAN or portion thereof may be configured so that one STA may transmit at a given time, e.g., in a given BSS. Channel access may include RTS and/or CTS signaling. For example, an exchange of a request to send (RTS) frame may be transmitted by a sending device and a clear to send (CTS) frame that may be sent by a receiving device. For example, if an AP has data to send to a STA, the AP may send an RTS frame to the STA. If the STA is ready to receive data, the STA may respond with a CTS frame. The CTS frame may include a time value that may alert other STAs to hold off from accessing the medium while the AP initiating the RTS may transmit its data. On receiving the CTS frame from the STA, the AP may send the data to the STA.

A device may reserve spectrum, e.g., via virtual CCA by using a network allocation vector (NAV). For example, in an IEEE 802.11 frame, the Duration field may be used to reserve a channel for a time period. A STA receiving the frame may set its NAV to the value in the Duration field of the frame. A STA may reserve the medium for the time for which it may expect to use the channel. When a STA reserves the medium, the NAV may be set for an associated WLAN or subset thereof (e.g., a BSS). Other STAs may count down the NAV to zero. When the counter reaches a value of zero, the NAV functionality may indicate to the STA that the channel is now free of medium reservation.

The devices in a WLAN, such as an AP or STA, may include one or more of the following: a processor, a memory, a radio receiver, and/or transmitter (e.g., which may be combined in a transceiver), one or more antennas, etc. A processor function may comprise one or more processors. For example, the processor may comprise one or more of: a general purpose processor, a special purpose processor (e.g., a baseband processor, a MAC processor, etc.), a digital signal processor (DSP), Application Specific Integrated Circuits (ASICs), Field Programmable Gate Array (FPGAs) circuits, any other type of integrated circuit (IC), a state machine, and the like. The one or more processors may be integrated or not integrated with each other. The processor (e.g., the one or more processors or a subset thereof) may be integrated with one or more other functions (e.g., other functions such as memory). The processor may perform signal coding, data processing, power control, input/output processing, modulation, demodulation, and/or any other functionality that may enable the device to operate in a wireless environment, such as the WLAN of FIG. 1D. The processor may be configured to execute processor executable code (e.g., instructions) including, for example, software and/or firmware instructions. For example, the processor may be configured to execute computer readable instructions included on one or more of the processor (e.g., a chipset that includes memory and a processor) or memory. Execution of the instructions may cause the device to perform one or more of the functions described herein.

A device may include one or more antennas. The device may employ multiple input multiple output (MIMO) techniques. The one or more antennas may receive a radio signal. The processor may receive the radio signal, e.g., via the one or more antennas. The one or more antennas may transmit a radio signal (e.g., based on a signal sent from the processor).

The device may have a memory that may include one or more devices for storing programming and/or data, such as processor executable code or instructions (e.g., software, firmware, etc.), electronic data, databases, or other digital information. The memory may include one or more memory units. One or more memory units may be integrated with one or more other functions (e.g., other functions included in the device, such as the processor). The memory may include a read-only memory (ROM) (e.g., erasable programmable read only memory (EPROM), electrically erasable programmable read only memory (EEPROM), etc.), random access memory (RAM), magnetic disk storage media, optical storage media, flash memory devices, and/or other non-transitory computer-readable media for storing information. The memory may be coupled to the processer. The processer may communicate with one or more entities of memory, e.g., via a system bus, directly, etc.

Figure 1D:
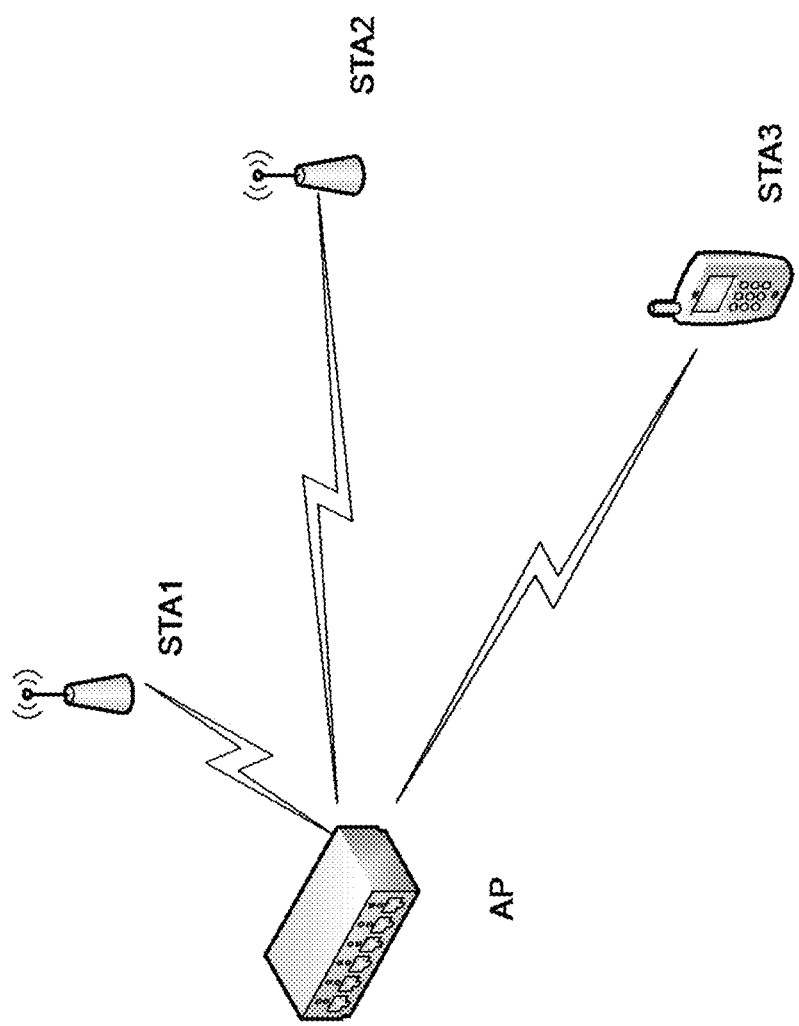
FIG. 1D depicts an exemplary WLAN system.

Turning to FIG. 1D, a WLAN in infrastructure basic service set (BSS) mode may have an access point (AP) for the basic service set and one or more stations (STAs) associated with the AP. The AP may have access or interface to a distribution system (DS) or another type of wired/wireless network that may carry traffic in and out of the BSS. Traffic to STAs may originate from outside the BSS, may arrive through the AP and may be delivered to the STAs. The traffic originating from STAs to destinations outside the BSS may be sent to the AP to be delivered to the respective destinations. Traffic between STAs within the BSS may be sent through the AP where the source STA may sends traffic to the AP and the AP may deliver the traffic to the destination STA. The traffic between STAs within a BSS may be peer-to-peer traffic. Such peer-to-peer traffic may be sent directly between the source and destination STAs, e.g., with a direct link setup (DLS) using an IEEE 802.11e DLS or an IEEE 802.11z tunneled DLS (TDLS). A WLAN using an independent BSS mode may have no APs, and the STAs may communicate directly with each other. This mode of communication may be an ad-hoc mode.

Using the IEEE 802.11 infrastructure mode of operation, the AP may transmit a beacon on a fixed channel, usually the primary channel. This channel may be 20 MHz wide, and may be the operating channel of the BSS. This channel may also be used by the STAs to establish a connection with the AP. The channel access in an IEEE 802.11 system may be Carrier Sense Multiple Access with Collision Avoidance (CSMA/CA). In this mode of operation, the STAs, including the AP, may sense the primary channel. If the channel is detected to be busy, the STA may back off.

In IEEE 802.11ac, very high throughput (VHT) STAs may support, e.g., 20 MHz, 40 MHz, 80 MHz, and/or 160 MHz wide channels. The 40 MHz, and 80 MHz channels may be formed, e.g., by combining contiguous 20 MHz channels. A 160 MHz channel may be formed, for example, by combining eight contiguous 20 MHz channels, or by combining two non-contiguous 80 MHz channels (e.g., referred to as an 80+80 configuration). For the 80+80 configuration, the data, after channel encoding, may be passed through a segment parser that may divide it into two streams. Inverse fast Fourier transform (IFFT), and time domain, processing may be done on each stream separately. The streams may be mapped on to the two channels, and the data may be transmitted. At the receiver, this mechanism may be reversed, and the combined data may be sent to the MAC.

Hybrid Automatic Repeat reQuest (HARQ) may provide transmission error control in wireless communication networks, which may rely on error correction codes and/or retransmissions. The types of HARQ combining schemes may include, e.g., Chase Combining (CC) HARQ, Incremental Redundancy (IR) HARQ, etc. In CC HARQ, each retransmission may include the same data and parity bits. A receiver may use Maximum Ratio Combining (MRC) to combine the received packet with previous transmission(s). CC may provide repetition coding, where each retransmission may increase the Eb/N0 at the receiver. In IR HARQ, each retransmission may use a different set of coded bits (e.g., one or more redundancy versions of coded bits may be generated by puncturing the encoder output). For turbo code different systematic and parity bits may be used. At each retransmission, the receiver may gain extra information. IR HARQ retransmission may include parity bits or the retransmission may be self-decodable.

HARQ schemes may be synchronous and/or asynchronous. The retransmissions in each of the HARQ schemes may be adaptive and/or non-adaptive. For synchronous HARQ, retransmission for each process may occur at predefined times, e.g., relative to the initial transmission. The HARQ process ID may be inferred from retransmission timing. For asynchronous HARQ, retransmissions may occur at any time, e.g., relative to the initial transmission. Signaling (e.g., explicit signaling) may be utilized to indicate the HARQ process ID. The HARQ process ID may be indicated for the receiver to associate each retransmission with the corresponding previous transmission.

The HARQ entity may be located in the MAC layer. The HARQ entity may be responsible for transmit and receive HARQ operations. The transmit HARQ operation may include transmission and retransmission of transport blocks, and reception and processing of acknowledgement (ACK)/ negative acknowledgement (NACK) signaling. The receive HARQ operation may include reception of transport blocks, combining of the received data, and generation of ACK/ NACK signaling based on decoding results. For example, up to eight HARQ processes in parallel may be used to support multiprocess Stop-And-Wait (SAW) HARQ operation, e.g., to enable continuous transmission while previous transport blocks may be decoded. Multiprocess HARQ may interlace one or more independent SAW processes in time, for example, so that each of the transmission resources may be used by one or more of the processes. Each HARQ process may be responsible for a separate SAW operation and may manage a separate buffer. Asynchronous adaptive HARQ may be used in the downlink and synchronous (e.g., adaptive and/or non-adaptive) HARQ may be used in the uplink. Signals which may be used to support HARQ may include, for example, HARQ process ID (e.g., for an asynchronous HARQ), New Data Indicator (NDI), Redundancy Version of the transmission block (RV) (e.g., for adaptive HARQ), or modulation and coding scheme (MCS) (e.g., for adaptive HARQ), etc. When a packet transmission (e.g., new packet transmission) begins, the NDI may be toggled.

In wireless communication networks, HARQ may provide error control. HARQ may rely on a combination of error correction codes and retransmissions. HARQ may be used in WiFi (e.g., High Efficiency WLAN (HEW), Wireless Next Generation (WNG), 802.11AX, etc.) to increase per link robustness and per link throughput for a WiFi system. For WiFi HARQ, HARQ signaling and/or HARQ signaling procedures may provide parameters and feedback between the HARQ transmitting STAs, receiving STAs, and/or unintended receiving STAs. MAC designs and procedures (e.g., current MAC designs and procedures) for WiFi are not capable of supporting HARQ operations. To enable WiFi HARQ operations, MAC designs may provide support for HARQ transmission and/or retransmission, reception, and ACK/NACK feedback. To support HARQ operations, service primitives may include parameters (e.g., new parameters) and may control HARQ processes. Systems, methods, and instrumentalities may be disclosed to enable HARQ operations in WiFi, which may include cross-layer features.

HARQ parameters and signaling and procedures may be provided. An access point (AP) or a station (STA) may include a HARQ Capability Indication in a NDP, a management, a control, or an extension frame, e.g., a beacon, a short beacon, a probe request and/or response, association request and/or response frames, etc. The HARQ Capability Indication may be implemented as a HARQ Capability Information Element (IE).

FIG. 2 illustrates an example design of HARQ Capability IE. The HARQ Capability IE may have one or more fields including, e.g., an Element ID field, a Length field, an HARQ Capabilities field, an HARQ Mode field, a Retry MCS mode field, an RV Modes field, a Concurrent HARQ Process field, an HARQ Coding field, etc. The HARQ Capability Element may include one or more of the following.

An ID in the Element ID field may identify that the IE may be a HARQ Capability Element. The Length field may indicate the length of the HARQ Capability Element. The HARQ Capabilities field may indicate the HARQ capabilities of the transmitting STA. The HARQ Capabilities field may indicate whether the transmitting STA may support HARQ operations, and what HARQ types (e.g., Chase Combining (CC), or Incremental Redundancy (IR)) may be supported. The HARQ Capabilities field may be a bitmap, where each bit may be associated with a supported mode. The HARQ Capabilities field may be implemented as an integer. A value of the field may indicate whether one or more of CC, and/or IR HARQ may be supported. The HARQ Capabilities field may be implemented as one bit indicator to indicate whether the transmitting STA supports HARQ.

The HARQ Mode field may indicate how an initial HARQ packet and a subsequent retransmission may be sent. The HARQ transmissions and retransmissions may be scheduled, unscheduled, contiguous, and/or non-contiguous. For example, an initial HARQ and a retransmissions (e.g., subsequent retransmissions) may be sent using one or more of scheduled slots, intervals, or beacon (sub)intervals, including, for example, Power Save Multi-Poll (PSMP) slots, Scheduled Automatic Power Save Delivery (S-APSD) slots, restricted access window (RAW) slots/Target Wake Time (TWT), Periodic RAW (PRAW), HARQ Slots, Periodic intervals, etc. In case of unscheduled transmission and/or retransmissions, an initial HARQ and a subsequent retransmission may be sent using one or more of the medium access schemes including, for example, within one multi-packet transmit opportunity (TXOP), speed Frame Exchange, Unscheduled Automatic Power Save Delivery (U-APSD) slots, hybrid coordination function (HCF) controlled channel access (HCCA) Poll, Polled by AP, ACK/NACK feedback polled by AP, in multiple TXOP, non-periodic intervals, etc.

The HARQ initial and subsequent retransmissions, and/or ACK/NACK feedback, may be transmitted in a contiguous approach, e.g., if a transmitting STA is transmitting a HARQ packet, it may continue the HARQ retransmissions when the transmitting STA may have access to the medium (e.g., within the same TXOP or in a sequence of TXOP), until the packet may be correctly received, or until the maximal retry may be reached.

In non-contiguous approach, the sequence of the HARQ initial and subsequent retransmissions, and/or ACK/NACK feedback, may be interrupted or interlaced by transmission of other packets by the same transmitting STA. For example, this mode may be used for multiple stop and wait HARQ process to allow a number of concurrent HARQ processes each for a different packet, or block of data. In another example, this mode may be used to allow transmissions of regular (non-HARQ) packets to be interlaced within HARQ initial and subsequent retransmissions and/or ACK/NACK feedback sequences.

The Retry Modulation and Coding Scheme (MCS) Mode field may indicate the mode of using MCS in an initial transmission and one or more subsequent retransmissions. The Retry MCS field may be specified for a HARQ process, and/or may be used to specify for transmission and retransmission (e.g., retries) of regular (e.g., non-HARQ) packets. The MCS mode may include, e.g., same MCS, adaptive MCS, unequal MCS, etc. The same MCS may be used for the initial and retries of the transmissions of a given (e.g., HARQ and/or non-HARQ) packet. A different MCS (e.g., an adaptive MCS) may be used for the initial and retries of the transmissions of a given (e.g., HARQ and/or non-HARQ) packet. Unequal MCS may be used for different MIMO streams and/or antennas.

The RV Modes field may provide RV related information of the HARQ process. If the HARQ type is not IR, the RV Modes field may be omitted or is empty or set to "0". The RV Modes field may provide the number of RVs a transmitting STA may support when conducting the HARQ procedure. The RV Modes field may provide implicit RV transmission order. A transmitting STA may transmit one or more different RVs. For example, the RVs may be transmitted in a pre-determined order, such as RV0, RV2, RV1, and RV3. The RV Modes field may provide RV indication (e.g., explicit indication) to specify whether explicit RV indication needs to be provided. If the RV Indication subfield is set, a transmitting STA of a HARQ frame using IR may indicate (e.g., explicitly) the version of the RV in the HARQ frame, e.g., in the Physical Layer Convergence Protocol (PLCP) and/or MAC header.

The Concurrent HARQ Process field may specify the number of concurrent HARQ processes that the transmitting STA may support, e.g., when conducting the HARQ procedure. The HARQ Encoding field may specify the encoding scheme that may be used when encoding an HARQ packet, e.g., Block Convolutional Code (BCC), low-density parity check code (LDP), turbo code, etc. The information about the LDPC and/or Turbo Iteration Counts may be added as parameters (e.g., recommended and/or mandatory parameters).

An AP may transmit an HARQ Operation IE, which may specify HARQ operations and parameters. The HARQ Operation IE may be transmitted in a NDP, a management, a control, and/or an extension frame, e.g., a beacon frame, a short beacon frame, a probe response frame, an association response frame, etc.

FIG. 3 illustrates an example of an HARQ Operation IE. The HARQ operation IE may have one or more of the following exemplary fields: an Element ID field, a length field, a HARQ Type Used field, a HARQ Mode field, a Retry MCS Mode field, a RV modes field, a Concurrent HARQ Process field, or an HARQ Coding field.

The ID in the Element ID field may identify that the information element is an HARQ Operation IE. A Length field may indicate the length of the HARQ Operation IE. A HARQ Type Used field may indicate the HARQ Type(s) that may be used for HARQ operation in a BSS (e.g., current BSS), such as Chase Combining (CC), and/or Incremental Redundancy (IR). This field may be implemented as a bitmap. Each bit of the bitmap may be associated with a supported mode. In this field an integer value may indicate the support of one or both of CC or IR. The remaining fields of the HARQ Operation IE may be similar to the corresponding fields of the HARQ Capability IE. These fields may be used to indicate the HARQ operations and the HARQ parameters being used in a BSS (e.g., current BSS).

HARQ Capability indication may be provided. For example, dot11HARQActivated parameter may be used to indicate that an STA and/or an AP is capable of HARQ. If dot11HARQActivated is true, an AP and/or an STA may include an indication of HARQ support in the VHT/S1G/HEWNHSE Capabilities field. The Capabilities field may be signaled in frames including, for example, a beacon frame, a short beacon frame, a probe request and/or a probe response frame, an association request and/or an association response frame, or a NDP, a management frame, a control, an extension frames, etc. Such an indication may be provided using one bit. When the bit is set to 1, HARQ may be supported by the AP and/or STA. A setting of the HARQ Supported indication in the VHT/S1G/HEWNHSE Capabilities field may imply that a HARQ Capability IE is included in the same packet or in a different packet, such as a beacon frame. If the dot11HARQActivated is true, an AP/STA may include a HARQ Capability IE in a beacon frame, a short beacon frame, a probe request and/or a probe response frame, an association request and/or an association response frame, or a NDP, a management frame, a control, an extension frames, etc. The inclusion of the HARQ Capability IE may be an indication that HARQ may be supported by the transmitting STA.

If dot11HARQActivated is true, an AP may include a HARQ Operation IE in a beacon frame, a short beacon frame, a probe request and/or a probe response frame, an association request and/or an association response frame, or a NDP, a management frame, a control, an extension frames to specify the HARQ operations and parameters used in a BSS (e.g., the current BSS). An AP may reject the association request from a STA based on the STA's HARQ capabilities.

The HARQ Capability IE and/or the HARQ Operation IE or a subset of the fields or subfields may be implemented as a field or a set of fields and/or a subfield or a set of subfields of an IE, e.g., an S1G Capability Element, an S1G Extended Capability, an VHT/HEWNHSE Capability Element, a VHT/HEWNHSE Extended Capability Element, or a part of a NDP, a control frame, a management frame, an extension frame, an MAC/PLCP headers fields, e.g., an SIG field, SIGA field, SIGB field, SIGC field, a frame control field, an HARQ Control field, etc.

HARQ ACK and/or NACK feedback may be provided. When the HARQ transmission is correctly received and decoded by a STA, the receiving STA may ACK the HARQ transmission. When the HARQ transmission is not correctly received, the receiving STA may inform the transmitting STA that it has not correctly received the HARQ packet, e.g., by transmitting an NACK frame.

A control frame, a control extension frame, or an extension frame, a NDP frame, may be designated as the NACK frame. The NACK frame may be identified by one or more of its Type field, Subtype field, or extension field, or NDP type field, or NDP MAC Frame Type field. FIG. 4 illustrates an example of an NACK frame. The NACK frame may have one or more of the following fields: a Frame Control field, a duration field, an RA field, an HARQ Info field, an FCS field, etc.

The Type field and/or the Subtype field may indicate that the frame is an NACK frame. The frame control field or another field in the frame, or PLCP header, or MAC header may include an extension field indicating that the frame is NACK frame. The extension field may be interpreted independently or in combination with the Type and/or Subtype field. The Type of the NACK frame may be set as a NDP, Management, a Control, a Data or an Extension type. For example, the NACK frame may be indicated by the NDP MAC Frame Type field in the PLCP header.

The Duration field, for example, in the MAC or PLCP header, may be used to reserve additional medium access time for a transmitting STA of the previous HARQ packets to retransmit the HARQ packets, or transmit a different RV of the previous HARQ packets. If no medium access time is reserved for subsequent transmission or retransmissions, the Duration field may be set to 0. No medium access time may be reserved when maximum number of retries is reached or the HARQ transmission sequence is not contiguous.

The RA field may indicate the receiving STA's (the transmitter of the HARQ packet being NACKed) address, e.g., a MAC address, AID, PAID, etc. The HARQ Info field may include the information about the HARQ process/ packets for which the NACK frame may be sent. The HARQ Info field may provide information including, e.g., an HARQ Process ID subfield, an RV subfield, a Recommended RV and MCS subfield, a No HARQ Indication subfield, etc. The HARQ process ID subfield may be implemented using HARQ Process ID, and/or packet Sequence Number and/or fragment Number. The RV subfield may indicate the RV for which the NACK may be sent. The RV information may be omitted or set to empty or set to "0", for example, if the NACK is designated for an entire HARQ process. The Recommended RV and MCS subfield may include recommendations for RV and/or MCS that may be used in the subsequent (re)transmissions. The No HARQ Indication subfield may indicate that a STA may prefer not to receive HARQ transmissions in the future.

One or more of the fields and subfields described above may be implemented as an NDP frame. In the NDP frame, one or more fields and/or subfields may be included in the PLCP header including, e.g., SIGA, SIGB, SIGC, or SIG field, etc.

Figure 5:
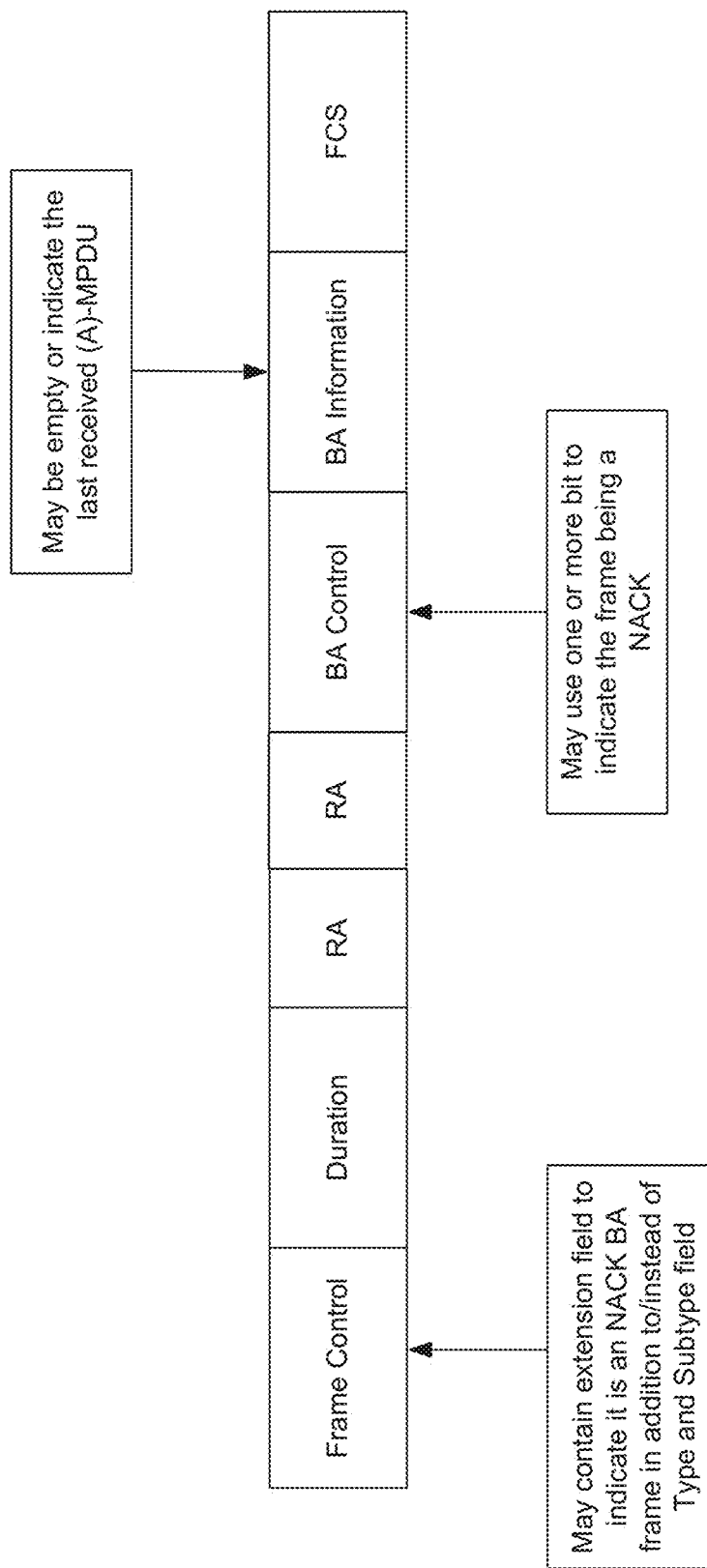
FIG. 5 depicts an exemplary Block Acknowledgement (BA) frame.

Block ACK (BA) frame may be used to implement a NACK frame. FIG. 5 illustrates an example of using a Block ACK frame as an NACK frame and/or multi-HARQ ACK/NACK frame. The Block ACK frame may be modified to act as a NACK frame and/or a multi-HARQ ACK/NACK frame. The MAC header may include an extension field. The extension field, by itself, or in combination of the Type and Subtype frame may indicate that the current frame is an NACK frame. The Type and Subtype fields may be used to indicate that the current frame is a BA frame.

The BA Control field of the BA frame may be modified in one or more ways. For example, one or more bits of the reserved (e.g., Bit 3 to Bit 11) may be set to 1 to indicate that the current BA frame is an NACK frame. FIG. 6 illustrates BA Control Field setting to indicate an NACK frame. As illustrated in FIG. 6, the Multi-TID Subfield Value and the Compressed Bitmap Subfield Value may be set to 1 and 0 respectively to indicate that the current BA frame Variant is an NACK. The Multi-TID Subfield Value and the Compressed Bitmap Subfield Value may be set to 1 and 0 respectively to indicate that the current BA frame Variant is a Multi-HARQ ACK/NACK.

The Multi-TID subfield (e.g., set to 1), or any other subfield, in combination with one or more NACK indicator(s) may indicate that the BA may include NACKs for multiple streams and/or HARQ processes. The combination may indicate that there may be multiple fields for multiple streams and/or HARQ processes in the BA Information field and/or other fields. For example, such indication may be used in a multiple Stop and Wait (HARQ) process.

The Multi-TID subfield (e.g., set to 1), or any other subfield, in combination with one or more HARQ ACK indicator(s) may indicate that the current frame may include ACKs for multiple streams and/or HARQ processes. The combination may indicate that there may be multiple ACK fields for multiple streams and/or HARQ processes in the BA Information field. For example, such indication may be used in a multiple Stop and Wait (HARQ) process.

The Multi-TID subfield (e.g., set to 1), or any other subfield, in combination with one or more HARQ indicator(s) may indicate that the current frame may include ACKs/NACKs for multiple streams/HARQ processes. The combination may indicate that there are multiple ACK/NACK fields for multiple streams/HARQ processes in the BA Information field or other fields. Each of such ACK/NACK subfields may have an ACK/NACK indication bit.

When the ACK/NACK indication bit is set to 0, the subfield may be an NACK field. When the ACK/NACK indication bit is set to 1, the subfield may be an ACK field. These indications may be used in a multiple Stop and Wait (MSOW) process. The ACK/NACK for multiple HARQ processes may be referred to as Multi-HARQ ACK/NACK.

The TID_Info subfield of the BA Control field may include the HARQ ID or part thereof, or the least significant 4 bits of the Sequence Number of a packet, which may not have been correctly received and/or may be being NACKed. One or more of the reserved bits (e.g., Bit 3 to Bit11) may be used to indicate that the HARQ ID or part thereof, or the least significant bits of the Sequence Number of the packet, which may not have been correctly received and/or may have been NACKed. The reserved bits may be used independently and/or in combination of the TID_Info field. The TID_Info field may include and/or imply the number of ACKed/NACKed HARQ processes, for example, if ACK/NACK for multiple HARQ processes are included in the Block ACK frame.

The BA Information field may be modified in one or more ways to provide the NACK related information. One or more of the following may apply.

The BA Information field may be omitted, e.g., when the NACK is sent (e.g., immediately) after the data packets and/or the reception of an NACK frame at the receiver's RA address implies that the prior data frame was not correctly received. The BA Information field may include the RV of the HARQ process for which an ACK/NACK may be sent. The Block ACK Starting Sequence Control may be set to the HARQ process ID, and/or the Sequence Number of the packet that may not have been correctly received and/or may have been NACKed.

The BA Starting Sequence Control may be set to the starting HARQ process ID, and/or the Sequence Number of the starting packet that may not have been correctly received and/or is being NACKed. The BA Bitmap may include bitmaps, which may indicate ACK/NACK for the HARQ processes, with the first bit may be used to indicate ACK/NACK for the starting HARQ process ID, and/or a starting packet. When a bit in the BA Bitmap is set to 0, the bit may indicate an NACK for the associated HARQ process. When a bit in the Block ACK Bitmap is set to 1, that bit may indicate an ACK for the associated HARQ process.

If the BA Information includes ACKs/NACKs for multiple HARQ processes, the Per-TID Info subfield may be set to the HARQ Process ID, or the Sequence Number of the packet associated with the HARQ Process. An RV field may be included for each of the HARQ ACK/NACKs. One or more bits may be used to indicate whether a HARQ process is being ACKed or NACKed.

The BA frames serving as NACK may include HARQ Info field and/or information from the HARQ Info field as described herein. The NACK or Multi-HARQ ACK/NACK may be implemented, for example, using NDP Block ACK. A (NDP) Block ACK Request (BAR) frame may be modified (e.g., similarly as the BA frame) to be used as (NDP) Block ACK/NACK Request or Request for Multi-HARQ ACK/NACK.

A combination of Type and Subtype field settings, for example, with Type equal to 10 and Subtype equal to 1001, in the MAC header may imply that the frame (e.g., a QoS Data+CF-ACK frame) may serve as a QoS Data packet and a CF-ACK for the packet that the transmitting STA may have received. A combination packet Data+NACK frame may be defined. The Data+NACK frame may be implemented as an extension frame, for example, by setting the Type equal to a value 11 and/or by setting the Subtype to one or more of the currently reserved values. A Data+NACK frame may reuse the Type and/or Subtype field values that may be used for other type of frames, and an extension subfield in the MAC header or the PLCP header may indicate that the frame is a DATA+NACK frame.

A frame, e.g., a data frame may have one or more bits of ACK/NACK indicator in the PLCP header and/or the MAC header of the frame. For example, if the ACK/NACK indicator is set to 0, the data packet may serve as an NACK frame for the packet that may have been transmitted to the transmitting STA immediately before the transmission of the current frame. If the ACK/NACK indicator is set to 1, the data packet may serve as an ACK for the packet transmitted to transmitting STA immediately before the transmission of the current frame.

Other types of combination frames may be implemented in a similar fashion, e.g., BlockAckReq+NACK, etc. The ACK/NACK implementations described herein may be used regardless the usage of HARQ. For example, the ACK/NACK implementations may be used to ACK/NACK other type of transmissions. The NACK frames may include HARQ Info field or information from the HARQ Info field (e.g., as described herein) in a field (e.g., an existing or a new field), or in a MAC header and/or a PLCP header.

A STA (e.g., a receiving STA) may provide ACK and/or NACK feedback. One or more of the following may apply.

The STA may send an ACK to a transmitting STA, within SIFS time and/or later to acknowledge that data bits associated with a HARQ transmission or a HARQ process that may have been correctly received and/or decoded. The correct reception may be indicated, e.g., by passing of an MAC Layer FCS check and/or an LDPC check. The ACK may be transmitted, e.g., after the last HARQ transmission of the packet. The ACK may be transmitted at a scheduled time. The ACK may be part of a Data+ACK frame, Multi-HARQ ACK/NACK frame, or an A-MPDU or A-MSDU.

A receiving STA may transmit an NACK to a transmitting STA if the STA may determine that a HARQ or a regular transmission was sent to itself, the received HARQ or the regular packet could not be decoded, or the FCS check or the LDPC check of the transmission failed. Such an NACK may follow directly after the last HARQ transmission of the packet. The NACK may be transmitted at a scheduled time. The NACK may also be part of a Data+NACK frame and/or other type of combo packet including, e.g., BlockAckReq+NACK. The NACK may be a part of a Multi-HARQ ACK/NACK frame, an A-MPDU, or A-MSDU.

A receiving STA may determine that a HARQ (or regular) transmission was addressed to itself when, for example, one or more HARQ or regular packets may have been scheduled to be transmitted to a receiving STA by one or more scheduling IEs or frames, but the reception of such packets failed. The failure may be indicated by failed FCS/CRC/LDPC check of the PLCP header, the MAC header, and/or the MAC frame.

A receiving STA may determine that a HARQ (or regular) transmission was addressed to itself when a STA is scheduled to provide feedback on a HARQ or a regular packet that it may receive, but no packets were received in a relevant period of time.

A receiving STA may determine that a HARQ (or regular) transmission was addressed to itself when, for example, a STA may detect a valid PLCP header (e.g., when it may have passed the CRC test), but may fail to decode the packet correctly based on the PLCP header. The STA may determine that the PAID/AID/ID included in the PLCP header may match with its PAID/AID/ID, but may fail to decode the packet. The failure may be indicated by, e.g., failed FCS test or LDPC test.

A receiving STA may determine that a HARQ (or regular) transmission was addressed to itself when for example, a STA may have detected a valid PLCP header and a MAC header, where the MAC header may be considered reliable and addressed to the receiving STA, but the STA may fail to decode the packet correctly. The failure may be indicated, e.g., by failed FCS test or LDPC test. A MAC header may be considered reliable, for example, when the MAC header (or a Robust Portion thereof) is sent using a more robust MCS; when the MAC header (or a Robust Portion thereof) has its own CRC and the CRC test past and the RA address matches the receiving STA's MAC address; and/or when PAID in the PLCP header may match the receiving STA's PAID, and/or the RA address in the MAC header (or a Robust Portion thereof) may match the receiving STA's MAC address.

To support HARQ operation, HARQ related parameters may be signaled during the HARQ transmission. The HARQ related parameters may be included in the PLCP header and/or the MAC header. The PLCP header of an HARQ (or, e.g., regular HEWNHSE) packet may be characterized by one or more of the following.

The PLCP header of an HARQ (or, e.g., regular HEWNHSE) packet may include an indicator that the current packet is an HARQ packet. The PLCP header may include a field indicating the HARQ process ID. A non-zero HARQ Process ID field may imply that a packet is a HARQ packet.

The PAID and/or GroupID field in the PLCP header may be used to include additional information on the extended PAID or AID, or other form of IDs of a receiving STA. The PLCP header may include the PAID or AID or other form of IDs of the transmitting STA. The PLCP header may include a field indicating the RV of the current HARQ transmission. The value of RV0 or other RV number may indicate that the current HARQ packet is a first transmission of a packet. The RV field may be omitted, for example, if a pre-determined order of transmitting RVs has been agreed upon. The PLCP header may include a Retry field to indicate whether the current HARQ packet may be a first transmission or a retransmission, e.g., with a different RV number.

The MAC header of a HARQ (or HEW/VHSE) packet may be characterized by one or more of the following. The MAC header may be protected by sending the packet at a robust MCS and/or with its own CRC. The MAC header may be considered valid, e.g., when the CRC or the LDPC check may pass. The MAC header may be divided into two portions, a Robust MAC header and a Regular MAC header. The Regular MAC header may be encoded and transmitted at the same MCS as the MAC frame body, while the Robust MAC header may be transmitted at a robust MCS and/or protected by its own error-detecting code, such as CRC. The fields in a Robust MAC header that may be transmitted at a robust MCS or protected by its own CRC may include, e.g., RA/PAID/AID/or other type of receiver ID, Sequence Number/HARQ Process ID, HARQ Indicator, RV, Retry, TA/PAID/AID or other type of transmitter ID. The MAC header may include an indicator that the current packet may be a HARQ packet. The MAC header may include a field indicating the HARQ process ID. A non-zero HARQ Process ID field may imply that the current packet is a HARQ packet. The Sequence Number in combination of the TA field may be considered as the HARQ Process ID. The MAC header may include a field indicating the RV of the current HARQ transmission. The value of RV0 or any other RV number may indicate that the current HARQ packet is a first transmission of a packet. The Retry field in the MAC header may be set to 0, e.g., to indicate that the current HARQ packet may be a first transmission. The Retry field in the MAC header may be set to 1, e.g., to indicate that the current HARQ packet is a retransmission, e.g., with a different RV number.

The HARQ parameter signaling procedure may be characterized by one or more of the following. A transmitting STA may indicate that the current frame is a HARQ packet in the PLCP and/or the MAC header, or in the Robust and/or the Regular MAC header. If a HARQ packet is the first transmission of a new HARQ process, the transmitting STA may set the Retry field to 0 in the PLCP/MAC header, or in the Robust/Regular MAC header. Otherwise, the transmitting STA may set the Retry field to 1. The transmitting STA may set the RV field to a predetermined value to indicate that the current HARQ packet is the first frame of a new frame. The transmitting STA may set the RV field to a different pre-determined value, or to the actual RV value of the HARQ packet in the retransmissions. The transmitting STA may include the HARQ process ID in the PLCP/MAC header or in the Robust/Regular MAC header. The transmitting STA may use the Sequence Number of the packet as the HARQ process ID, or set any part of the Sequence Number field, such as the fragmentation field, to/as the HARQ Process ID. The receiving STA may provide an ACK/NACK feedback for the HARQ frame addressed to it. The ACK/NACK feedback may include HARQ related parameters such as HARQ Process ID, RV number, Recommended RV/MCS, or No HARQ indication, etc.

Figure 7:
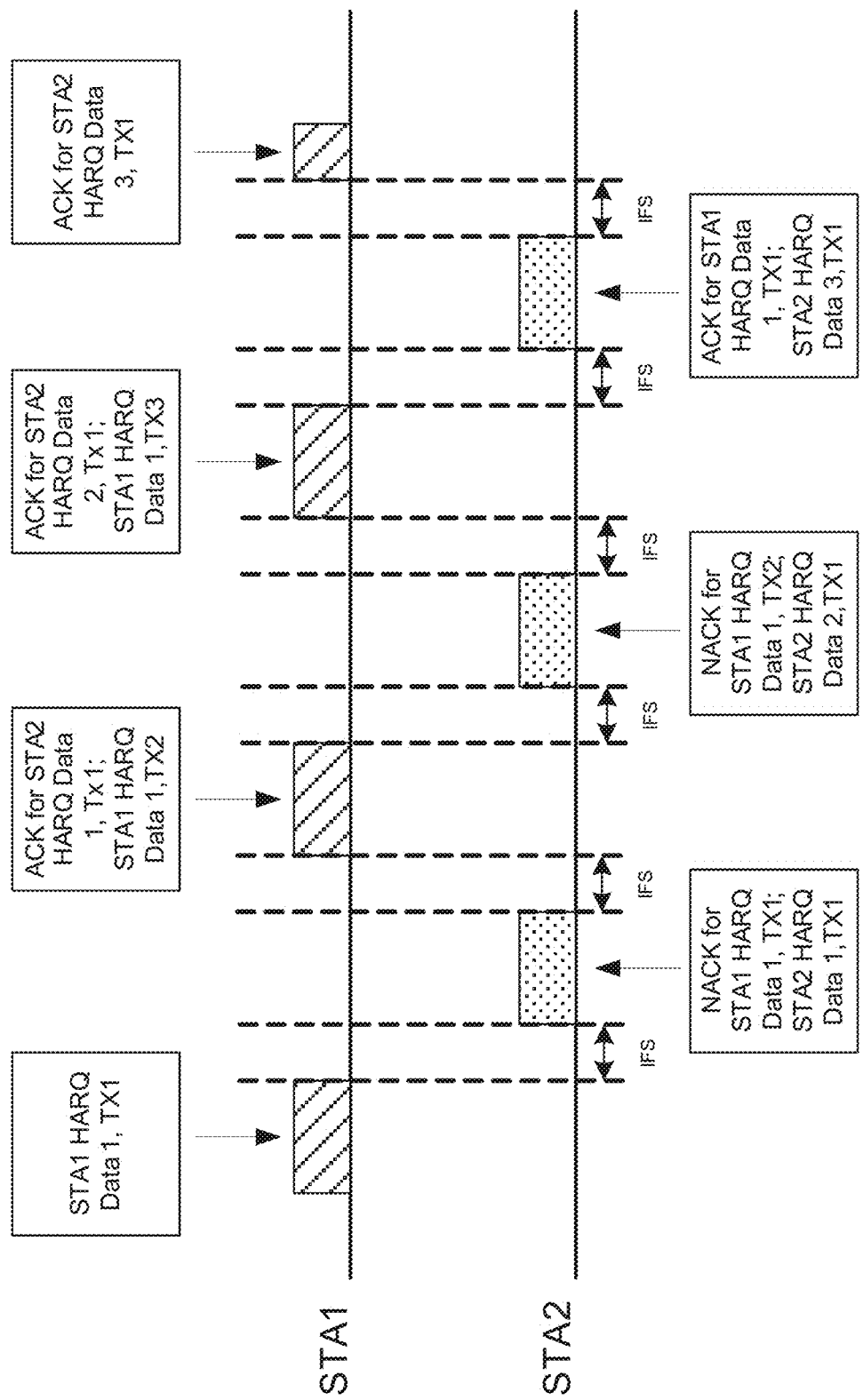
FIG. 7 depicts an exemplary HARQ operation using Speed Frame Exchange.

HARQ operation using Speed Frame Exchange (SF) may be provided. FIG. 7 illustrates an example design of an HARQ operation using the Speed Frame Exchange. In a Speed Frame Exchange that may support HARQ operation, a Data+ACK/NACK frame may be considered as a valid response frame in the Speed Frame Exchange (HARQ operation) frame exchange sequence. An A-MSDU or an A-MPDU that may include an ACK, NACK, Block ACK/NACK, and/or multi-HARQ ACK/NACK frame may be considered as a valid response frame in the Speed Frame Exchange (HARQ operation) frame exchange sequence.

As illustrated in FIG. 7, STA1 may have a packet to send to STA2, and once STA1 has obtained access to the channel, STA1 may initiate a HARQ process, e.g., referred to as STA1 Data 1. The HARQ process may be identified using the packet sequence number or other HARQ Process ID, by sending the first transmission TX1 of STA1 Data 1, e.g., identified by a specific RV number, or a field with Retry equal to 0, or TX equal to 1. The value TXN may designate the Nth transmission of a HARQ process. The transmissions of a HARQ process may have same and/or different RVs, and/or may be transmitted using the same and/or different MCS'.

If the STA2 may determine that the transmission was addressed to itself, e.g., by decoding sufficient information from the PLCP header, MAC header, Robust MAC header, etc., the STA2 may reply using a combination of first transmission TX1 addressed to STA1 of a HARQ process, e.g., referred to as STA2 Data 1, which may be identified using a packet sequence number or an HARQ Process ID. For example, the transmission may be identified by an RV number of a field with the value Retry equal to 0 or Tx equal to 1, and/or an ACK/NACK for STA1 Data 1, TX1. Depending on whether STA2 may successfully decode the TX1 of STA1 Data 1, the STA2 may use ACK or NACK in a combination packet. If, for example, the FCS or LDPC check failed, the STA2 may include an NACK, otherwise the STA2 may include an ACK. As illustrated in FIG. 7, the STA2 may include an NACK for TX1 of the HARQ process STA1 Data 1 or for the HARQ process STA1 Data 1. The combination packet, may be, e.g., a Data+ACK or a Data+NACK as described herein. The combination packet may be an A-MSDU or an A-MPDU. The A-MSDU or an A-MPDU may include an ACK/NACK, Block ACK/NACK, and/or Multi-HARQ ACK/NACK frame. These frames may be included as the first portion of the A-MPDU or the A-MSDU.

The STA1 may receive a combination packet from STA2 including, e.g., an NACK for STA1 Data 1, TX1, and TX1 of the HARQ process STA2 Data 1. The STA1 may reply with a combination of retransmission of STA1 Data 1, namely TX2, which may be the same as the TX1, or a different RV, and/or may use a different MCS scheme, provided that the maximal number of retry for the HARQ packet has not been reached, and an ACK/NACK for the first transmission TX1 of the HARQ process STA2 Data 1. As illustrated in FIG. 7, the STA1 may include an ACK for the first transmission TX1 of the HARQ process STA2 Data 1 or for the HARQ Process STA2 Data 1.

The STA2 may receive a combination packet from STA1 including, e.g., an ACK for STA2 Data 1, TX1, and a retransmission of STA1 Data 1, TX2. The STA2 may reply with a combination of the first transmission of a new HARQ process, e.g., STA2 Data 2, TX1, e.g., if STA2 has a new packet to transmit to STA1, and an NACK for the retransmission TX2 of the HARQ process STA1 Data 1, because the STA1 may have failed to correctly receive it. The failure of reception may be indicated by, e.g., failed FCS or failed LDPC check.

The STA1 may receive a combination packet from STA2 including, e.g., an NACK for STA1 Data 1, TX2 or for the HARQ process STA1 Data 1 and TX1 of the HARQ process STA2 Data 2. The STA1 may reply with a combination of a second retransmission of STA1 Data 1, TX3, which may be the same as TX2 or TX1, or a different RV, and an ACK for the first transmission TX1 of the HARQ process STA2 Data 2. The STA1 may use a different MCS scheme, provided that the maximum number of retries for the HARQ packet has not been reached.

The STA2, may receive a combination packet from STA1 including, e.g., an ACK for STA2 Data 2, TX1 or STA2 Data 2, and a retransmission of STA1 Data 1, TX3. The STA2 may reply with a combination of the first transmission of a new HARQ process STA2 Data 3, TX1, if STA2 has a new packet to transmit to STA, and an ACK for the retransmission TX3 of the HARQ process STA1 Data 1 or for the HARQ process STA1 Data 1, if the packet associated with the HARQ process STA1 Data 1 has been decoded correctly, after appropriate HARQ combining (e.g., CC or IR). After sending an ACK, the STA2 may flush the HARQ memory associated with the corresponding HARQ process. The STA2 may maintain a record of the HARQ process STA1 Data 1, which may have been correctly received for a period of time so that if another packet arrives that is related to STA1 Data 1, e.g., a Block ACK/NACK Request, Multi-HARQ ACK/NACK Request, or a retransmission of STA1 Data 1, STA2 may respond with an ACK for STA1 Data 1 and discard the incoming packets. The STA2 may indicate in the transmission that it has no more packets to transmit to STA1.

The STA1 may receive a combination packet from STA2 including, e.g., an ACK for STA1 Data 1, TX3 or for the HARQ process STA1 Data 1, and TX1 of the HARQ process STA2 Data 3. The STA1 may reply with an ACK if it may be able to correctly decode the packet that is associated with the HARQ process STA2 Data 3. The STA1 may erase stored copies related to STA1 Data 1. After sending an ACK, the STA2 may flush the HARQ memory associated with the corresponding HARQ process. STA2, after receiving the ACK from STA1, may erase stored copies related to STA2 Data 3.

The ACK and NACK may be implemented using ACK, Block ACK frames, or NACK frame, combo packets such as Data+ACK, Data+NACK, multi-HARQ ACK/NACK, or an A-MSDU or an A-MPDU including one or more of the previous types of frames. The time between the frame exchanges may be an Inter Frame Space, e.g., SIFS, PIFS, etc., or an IFS of one or more time units.

Figure 8:
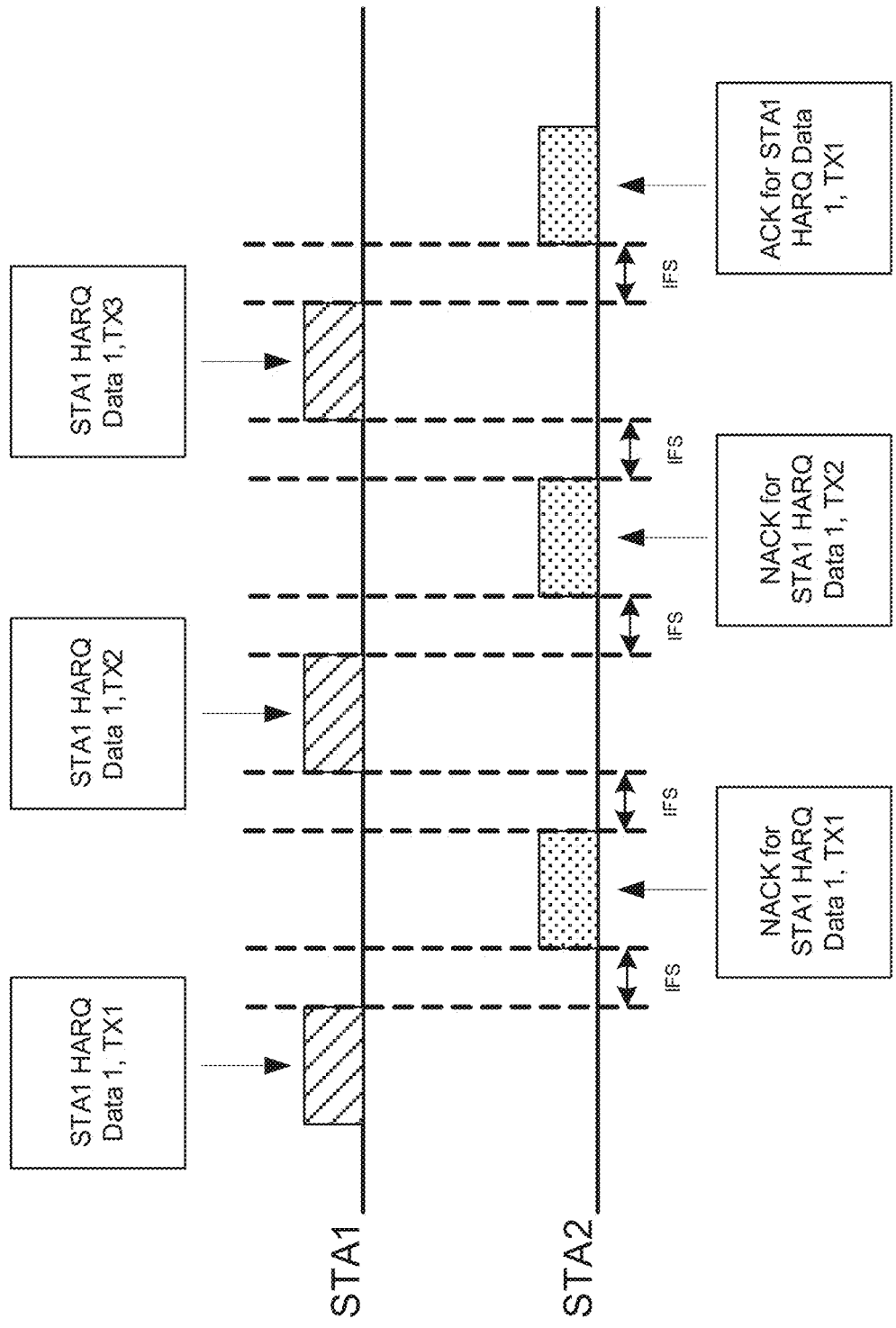
FIG. 8 depicts an exemplary HARQ operation using the multi-frame transmission opportunity (TXOP).

The HARQ operation may be supported using the multi-frame TXOP. FIG. 8 illustrates an example HARQ operation using the multi-frame TXOP. An HARQ MAC implementation using multi-frame TXOP may be provided. As illustrated in FIG. 8, STA1 may have a packet to send to STA2, and once STA1 has obtained an TXOP to access the channel (e.g., by RTS/CTS frame exchange with STA2 or a scheduled or polled TXOP or EDCA TXOP), the STA1 may initiate a HARQ process, e.g., referred to as STA1 Data 1, which may be identified using a packet sequence number or other HARQ Process ID, or by sending the first transmission TX1 of STA1 Data 1, e.g., identified by a specific RV number or a field with value Retry equal to 0 and/or Tx equal to 1.

If STA2 can determine that the transmission was addressed to itself, e.g., by decoding information from the PLCP header, MAC header, Robust MAC header, etc., it may reply with an ACK/NACK for STA1 Data 1, TX 1 or the HARQ process STA1 Data 1. The STA2 may reply with an ACK or NACK based on whether the STA2 could successfully decode TX1 of STA1 Data 1. If, for example, the FCS or LDPC check failed, the STA2 may reply with an NACK; otherwise, the STA2 may reply with an ACK. As illustrated in FIG. 8, STA2 may include an NACK for the HARQ process STA1 Data 1.

STA1 may receive an NACK for STA1 Data 1, TX1 from STA2. The STA1 may reply with a retransmission of STA1 Data 1, TX2, which may be the same as the TX1, or a different RV, and/or may use a different MCS scheme, provided that the maximal number of retry for the HARQ packet has not been reached.

The STA2 may receive a retransmission of STA1 Data 1, namely TX2 from STA1. The STA1 may decode the received packet using appropriate HARQ combining (e.g., CC or IR). The STA2 may reply with an NACK for the retransmission TX2 of the HARQ process STA1 Data 1 or the HARQ process STA1 Data 1, because the STA2 may have failed to correctly decode the data associated with the HARQ process. The failure to decode the data may be indicated by, e.g. by a failed FCS.

The STA1 may receive a NACK for STA1 Data 1, TX1 or for STA1 Data 1. The STA1 may reply with a second retransmission of STA1 Data 1, TX3, which may be the same as TX2 or TX1, or a different RV, and/or use a different MCS scheme, provided that the maximal number of retry for the HARQ packet has not been reached.

The STA2 may receive the retransmission of STA1 Data 1, TX3, and may decode the received packet using appropriate HARQ combining (e.g., CC or IR), and may reply with an ACK for the retransmission TX3 of the HARQ process STA1 Data 1 or for the HARQ process STA1 Data 1, if the packet associated with the HARQ process STA1 Data 1 has been decoded correctly. After sending an ACK, the STA2 may flush the HARQ memory associated with the corresponding HARQ process. The STA2 may maintain a record of the HARQ process STA1 Data 1, which may have been correctly received for a period of time so that if another packet arrives that is related to STA1 Data 1, e.g., a Block ACK/NACK Request, Multi-HARQ ACK/NACK Request, or a retransmission of STA1 Data 1, STA2 may respond with an ACK for STA1 Data 1 and discard the incoming packets. The STA1 may receive the ACK for STA1 Data 1, TX 3, or for the HARQ process STA1 Data1 and may erase stored copies related to STA1 Data 1 in its data buffer or memory.

The ACK and NACK may be implemented using existing ACK, Block ACK frames, or other (e.g., newly designed) NACK frames, multi-HARQ ACK/NACK, or any A-MSDU or A-MPDU including any of the previous types of frames. The time between the frame exchanges may be an Inter Frame Space, such as SIFS, PIFS, HARQ IFS (HIFS), etc., or an IFS of one or more time units.

The HARQ operation may be supported by using scheduled HARQ operation, e.g., using PSMP (Power Saving Multi-Poll) slots, S-ASPD (Scheduled Advanced Power Saving Delivery) slots, RAW (Restricted Access Window) slots, PRAW (periodic Restricted Access Window) slots, TWT (Target Wake Time) or any other slots defined. These and potentially new slots or periods may be referred to as HARQ Slots (HSlots).

Figure 9:
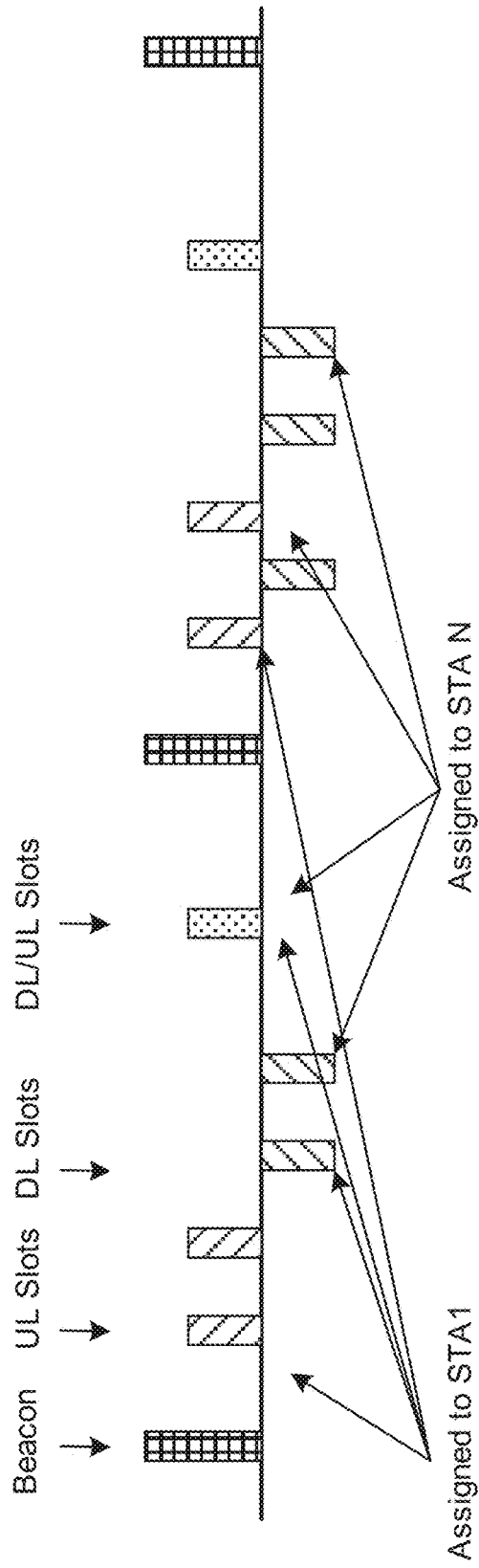
FIG. 9 depicts an exemplary scheduled HARQ.

FIG. 9 illustrates an example of a scheduled HARQ. As illustrated in FIG. 9, an AP may allocate one or more up link (UL), down link (DL) or combined UL/DL Hslots for a STA. The scheduled HSlots may be periodic or aperiodic. An AP may include a schedule in a beacon frame or a Resource Allocation frame, or a NDP, Management, Control, Data, and/or Extension frame.

A slot may be assigned to one STA or a group of STAs. A slot assigned for a group may be contention-based or contention-free. In a contention-free slot for a group of STAs, the order of transmissions or receptions may be pre-determined or signaled (e.g., inherently signaled) through a beacon frame, a scheduled frame, or a NDP, management, control and/or extension frame.

An UL slot may be used by a STA to transmit a UL frame, a HARQ frame, a combination frame such as a Data+ACK/NACK frame, an A-MPDU and/or an A-MSDU frame, which may include the data frames and other management, control and/or extension frames, e.g., ACK/NACK, multi-HARQ ACK/NACK frames. An UL slot may be long enough for the transmitting STA to complete its transmission and for the receiving STAs to transmit an ACK/NACK frame. An UL slot may be provided for a STA to transmit ACK/NACK frames, multi-HARQ ACK/NACK feedback for previous received frames, ACK/NACK Request, Block ACK/NACK Request or Multi-ACK/NACK Request frames. An UL slot may be used for peer-to-peer transmissions among the STAs.

A DL slot may be used by the AP to transmit a DL frame, a HARQ frame, a combination frame, e.g., a Data+ACK/NACK frame, an A-MPDU and/or an A-MSDU frame, which may include data frames and other management, control and/or extension frames such as ACK/NACK, multi-HARQ ACK/NACK frames or scheduling frames. If a DL frame is assigned to a group of STAs, the AP may use the DL slot to transmit group-addressed multicast or broadcast frames. The AP may transmit multi-user A-MSDU and/or A-MPDU to one or more STAs. An AP may utilize an DL frame to transmit ACK/NACK, multi-HARQ ACK/NACK feedback for previous frames transmitted to it, or ACK/NACK Request, Block ACK/NACK Request or Multi-ACK/NACK Request frame. A combined UL/DL slot may be used as multi-frame TXOP or a Speed Frame Exchange session for HARQ. A combined UL/DL slot may be used by a STA to transmit one or more HARQ frames to different STAs.

An AP may assign a list of DL slots and one or more UL to a STA. During the DL slots the AP may transmit one or more HARQ processes packets to the STA. In the UL slot, the STA may provide ACK/NACK and/or multi-HARQ ACK/NACK feedback to the AP, e.g., when the STA may be polled by the AP or after the STA may receive an ACK/NACK Request, Block ACK/NACK Request, or Multi-ACK/NACK Request frame. The AP may assign a list of UL slots and one or more DL slots to a STA. During the UL slots the STA may transmit multiple HARQ processes packets to a STA or the AP, and in the DL slot, the AP may provide ACK/NACK or multi-HARQ ACK/NACK feedback to the STA, e.g., when the AP receives an ACK/NACK Request, Block ACK/NACK Request, or Multi-ACK/NACK Request frame.

Figure 10:
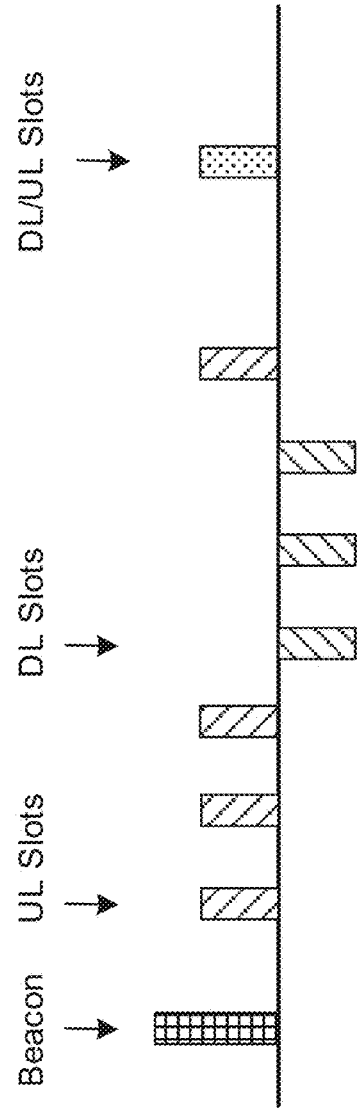
FIG. 10 depicts an exemplary scheduled multiple stop and wait (MSOW) HARQ operation.

WiFi multiple stop and wait (MSOW) HARQ operations may be provided. The MSOW HARQ operations may provide higher throughput and efficiency due to smaller feedback overhead. FIG. 10 illustrates an example of scheduled MSOW HARQ operations. One or more UL slots may be assigned to a STA. The STA may start one or more HARQ processes.

As illustrated in FIG. 10, a STA may transmit one or more packets associated with the multiple HARQ processes to an AP (or to another peer STA) in each of the UL slots assigned to it, e.g., without first receiving the feedback. The maximum number of HARQ processes (e.g., incomplete HARQ processes) per STA may be subject to a limit, e.g., as indicated by Maximal Concurrent HARQ Process parameters specified in the HARQ Capability and/or Operation Element. In a DL slot assigned to the STA, the AP (or a peer STA) may provide ACK/NACK, multi-HARQ ACK/NACK feedback to the UL HARQ packets associated with the multiple stop and wait HARQ processes. The ACK/NACK, multi-HARQ ACK/NACK feedback may be part of a A-MSDU or A-MPDU in a DL slot, or DL/UL slot, for example a feedback slot, assigned to the STA. The ACK/NACK, multi-HARQ ACK/NACK feedback may be part of a A-MSDU or A-MPDU in a DL slot, or DL/UL slot, for example a group feedback slot, assigned to a group of STAs. The A-MSDU or A-MPDU may provide ACK/NACK for multiple STAs for one or more HARQ processes. The AP may provide ACK/NACK or multi-HARQ ACK/NACK feedback to the STA, e.g., after receiving an ACK/NACK Request, Block ACK/NACK Request or Multi-ACK/NACK Request frame.

An AP may transmit one or more packets associated with multiple HARQ processes to a STA in each of the DL slots assigned to the STA or a group of STAs, without first receiving the feedback. The maximum number of HARQ processes (e.g., incomplete HARQ processes) per STA may be subject to a limit, e.g., as indicated by the Maximal Concurrent HARQ Process parameters in the HARQ capability and/or operation information element. In an UL slot assigned to a STA, the STA (or a peer STA) may provide ACK/NACK, multi-HARQ ACK/NACK feedback to the UL HARQ packets associated with the multiple stop and wait HARQ processes. The ACK/NACK, multi-HARQ ACK/NACK feedback may be part of a A-MSDU or A-MPDU in a UL slot, or DL/UL slot, for example a feedback slot assigned to the STA. The ACK/NACK, multi-HARQ ACK/NACK feedback may be provided in a UL slot, or DL/UL slot, for example a group feedback slot, assigned to a group of STAs, where a group of STAs may provide ACK/NACK for multiple HARQ processes. The STA may provide ACK/NACK or multi-HARQ ACK/NACK feedback to the AP, e.g., when the STA may be polled by the AP or the STA may receive an ACK/NACK Request, Block ACK/NACK Request or Multi-ACK/NACK Request frame.

The MSOW HARQ operations may be conducted by transmitting HARQ packets, A-MSDU or A-MPDU packets, e.g., including HARQ packets, ACK/NACK, multi-HARQ ACK/NACK in combined DL/UL slots or other type of Hslots. The transmitting STA may request ACK/NACK feedback using a HARQ Feedback request frame. Upon the reception of which, the receiving STA or an AP may transmit Data+ACK/NACK, ACK, NACK or Multi-HARQ ACK/NACK frame as a response.

Figure 11:
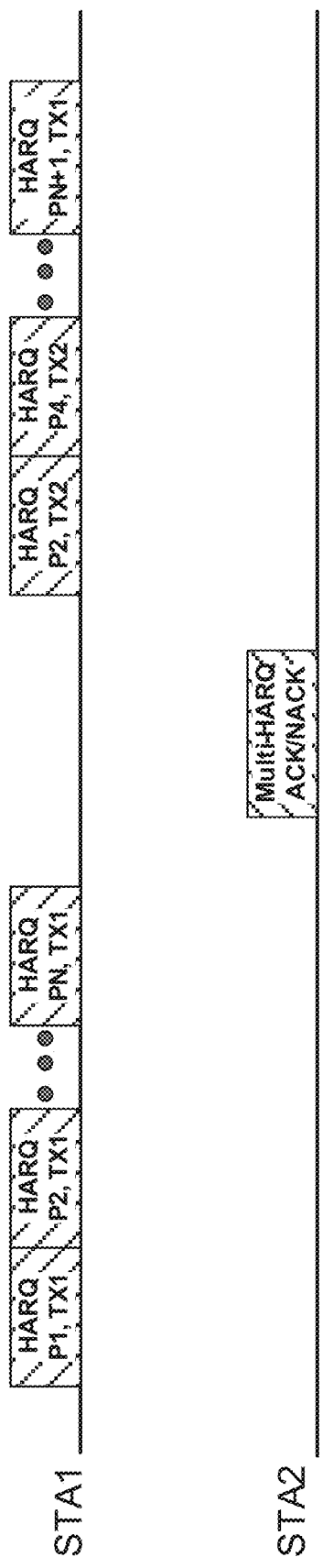
FIG. 11 depicts an exemplary MSOW HARQ process using aggregated packets.

FIG. 11 illustrates an example of a MSOW HARQ process using aggregated packets. As illustrated in FIG. 11, STA1 may transmit an aggregated packet, e.g., an A-MDPU or an A-MSDU (e.g., a constructed A-MDPU or A-MSDU) to STA2. For example, the STA1 may transmit the aggregated packets with HARQ packets associated with multiple HARQ processes, e.g., the first transmissions TX1 of the HARQ processes, HARQ P1, HARQ P2, . . . , HARQ PN. The HARQ packets associated with multiple HARQ processes may be separated by delimiters, CRC fields, padding, etc. The total number of HARQ processes (e.g., incomplete HARQ processes) may be subject to maximal Concurrent HARQ Process parameter, e.g., indicated in an HARQ Capability or Operation information element. The last packet included in the aggregated packet may also be a HARQ Feedback request frame, or a Multi-HARQ Feedback request frame requesting feedback for the multiple HARQ processes. A HARQ Feedback request frame, or a Multi-HARQ Feedback request frame requesting feedback for the multiple HARQ processes may follow immediately or after some time after the completion of the aggregated packets with HARQ packets associated with multiple HARQ processes.

The STA2 may respond, e.g., after some IFS (e.g., SIFS time) or at a later point of time, with a Multi-HARQ ACK/NACK frame, in which STA2 may ACK for HARQ processes for which the data may be correctly received, and NACK for HARQ processes for which the data may not be correctly received. The failure to receive data correctly may be indicated by failed FCS or LDPC checks, e.g., after being polled by the AP or after receiving an ACK/NACK Request, Block ACK/NACK Request, or Multi-HARQ ACK/NACK. The Multi-HARQ ACK/NACK frame may be part of an A-MPDU or A-MSDU, which may include data frames for STA1.

STA1 may receive the Multi-HARQ ACK/NACK frame. The STA1, e.g., after receiving the Multi-HARQ ACK/NACK frame, may erase the copies of data associated with those HARQ processes for which an ACK may have been received from STA2. The STA2 may send single HARQ packet or aggregated packets that may include retransmissions TX2 for HARQ processes for which NACK may have been received from STA2. If no ACK or NACK has been received for one or more HARQ processes, the latest version of these HARQ processes that has not been ACKed or NACKed may be included in the aggregated packets. If the total number of HARQ processes (e.g., incomplete HARQ processes) per STA is less than the maximal Concurrent HARQ Process, the STA1 may initiate new HARQ processes and may include the first transmission, TX1, of these new HARQ processes in the same aggregated packet. The aggregated packet may include ACK/NACK for a HARQ process, e.g., sent by STA2 to STA1. STA1 may continue transmitting retransmissions for HARQ processes for which the data may not have been ACKed. The STA1 may transmit retransmissions for HARQ processes until the maximal retry number for HARQ has been reached. The transmitting STA may request (e.g., explicitly request) ACK/NACK feedback using an HARQ Feedback request frame. The receiving STA on receiving the request may transmit Data+ACK/NACK, ACK, NACK or Multi-HARQ ACK/NACK in response.

HARQ Operation fault recovery may be provided. If a transmitting STA transmits a packet of data, which may be a RV, that is associated with a HARQ process, the STA may erase the copies associated with the HARQ process if the HARQ process has been ACKed by the receiving STA. The transmitting STA may transmit the same version of the packet associated with the HARQ process, e.g., with a different MCS, if an NACK has been received for the HARQ process from the receiving STA and the HARQ operation is set to, e.g., Chase Combining. The transmitting STA may transmit a different RV of the packet associated with the HARQ process. The different RV may be determined beforehand and the packet may be sent, e.g., with a different MCS, if an NACK was received for the HARQ process from the receiving STA and the HARQ operation is set to, e.g., Incremental Redundancy.

The transmitting STA may maintain a HARQ_Timeout counter for the HARQ process. The transmitting STA may retransmit the last version of the packet associated with the HARQ process to the receiving STA, e.g., using a lower MCS, if no ACK or NACK has been received from the receiving STA when the HARQ_Timeout counter expires, or when a scheduled ACK/NACK feedback was not received.

If a receiving STA receives a frame and may not correctly decode the PLCP header, it may discard the frame. If the STA correctly decodes the PLCP header, e.g., indicated by CRC and/or LDPC checks, and the packet is a HARQ frame, the STA may respond with an ACK frame to the transmitting STA, erase each of the stored copies associated with the HARQ process if it correctly decodes the data associated with the HARQ process, e.g., as may be indicated by CRC/FCS/LDPC checks. The decoding of data may involve combining the received HARQ packet with previously received HARQ packets and versions of the same HARQ process ID. The receiving STA may maintain a record of the HARQ process that may be correctly received for a period of time. The receiving STA may maintain the record so that if one or more packets (e.g., such as a Block ACK/NACK Request, Multi-HARQ ACK/NACK Request, or a retransmission of this HARQ process) related to the HARQ process arrive, the receiving STA may respond with an ACK for the HARQ process and discard the incoming packet(s).

The receiving STA may store the received frame (or the soft bits of received data packet), and send to the transmitting STA an NACK for the HARQ process, if the receiving STA could determine that the HARQ packet is destined to itself, e.g., by evaluating the PLCP header, MAC header, or Robust MAC header as described herein, the HARQ process ID, and the data associated with the HARQ process cannot be correctly decoded, e.g., as indicated by failed CRC/FCS/LDPC checks. The decoding of data may involve combining the received HARQ packet with previously received HARQ packets and versions of the same HARQ process ID. The receiving STA may discard the frame, if the receiving STA could not determine that the HARQ packet is destined to itself.

The ACK/NACK/Data frames may be transmitted as a part of a single frame, or a combo frame such as Data+ACK/NACK or as a part of an aggregated frame such as A-MPDU or A-MSDU.

The HARQ may be utilized by WiFi devices for higher throughput and efficiency. HARQ packets may be transmitted at higher MCS than normal packets. If a STA starts to receive a packet and has correctly decode the PLCP header, e.g., as may be indicated by CRC and/or LDPC checks, and the packet is a HARQ frame, the receiving STA may respond with an ACK frame to the transmitting STA.

If the data associated with the HARQ process cannot be correctly decoded, e.g., as may be indicated by failed CRC/FCS/LDPC checks, the receiving STA may not wait for an EIFS time before transmitting. The receiving STA may send (e.g., immediately send), to the transmitting STA, an NACK for the HARQ process; for example, the receiving STA may send the NACK after an SIFS time, e.g., if the receiving STA determines that the HARQ packet is destined to itself, (e.g., by evaluating the PLCP header, MAC header, or Robust MAC header as described herein). Such a decoding process may be combined with previously received HARQ packets and versions of the same HARQ process ID.

Cross layer implementations for HARQ in WiFi may be provided. The TXVector and the RXVector may be modified to support HARQ operation in WiFi. For example one or more parameters may be provided including, e.g., HARQ Transmission, HARQ Type, RV, HARQ Process ID, an New HARQ Indication (or Retry indicator), and/or LDPC Check Failed. The HARQ Transmission parameter may provide an indicator that the transmission/reception may be using HARQ. The HARQ Type parameter may indicate whether the HARQ may be Chase Combining or Incremental Redundancy. The RV parameter may indicate the redundancy version that may be used in the current transmission or reception. The HARQ Process ID parameter may indicate the ID of the HARQ process. The New HARQ Indication (or Retry indicator) may indicate whether the current HARQ transmission/reception is a new HARQ process. The LDPC Check Failed parameter may be in RXVector and may indicate that the LDPC check has failed for the currently received packet or HARQ Process.

PHY-SAP primitives, e.g., PHY-TXSTART.request, PHY-RXSTART.indication may be changed to support HARQ. The PHY-TXSTART.request may include the TXVector that may include the HARQ related parameters as described herein. The PHY-TXSTART.request primitive may be issued by the MAC sublayer to the PHY entity when the MAC sublayer may begin the transmission of a PSDU. If the PSDU is a HARQ PSDU, HARQ related information may be included in the TXVECTOR. If the HARQ transmission is indicated in the TXVECTOR, the PHY layer may start the HARQ transmit state machine. The PHY-RXSTART.indication may include the RXVECTOR that may include the HARQ related parameters as described herein when a correctly decoded PLCP header has an HARQ indication and/or includes one or more HARQ related parameters.

HARQ may provide transmission error control in wireless communication networks, which may rely on a combination of error correction codes and/or retransmissions. HARQ may be used for transmission error control in wireless standards, e.g., High Efficiency WLAN (HEW), Wireless Next Generation (WNG), etc. HARQ may provide increased per-link robustness and/or per-link throughput for WiFi systems. To provide efficient and robust HARQ operation in WiFi systems, one or more aspects related to HARQ operation may be designed.

HARQ operations in WiFi networks may be provided. In WiFi networks, a transmission failure may occur, e.g., due to a collision, poor channel condition, or other interferences. WiFi networks may not be able to distinguish between the failures that may occur. WiFi specifications may not provide mechanisms (e.g., efficient mechanisms) to distinguish between these types of failures.

In Wi Fi network, the information available in a MAC header, for example, the transmitter MAC address, the receiver MAC address etc. may be used for HARQ operations. Stations (STAs) may decode MAC header successfully to determine attributes, e.g., MAC address of the transmitting and the receiving devices (e.g., STAs). To support HARQ operation in a WiFi network, the information included in the MAC header may be decoded, even when the data in a MAC frame is not decodable. In some cases, a MAC header may be coded in combination with the rest of data with no additional protection, which may make the effective retrieval of the MAC header difficult. WiFi networks may be optimized (e.g., the latency may be minimized), e.g., to retrieve information included in a MAC header.

In WLAN systems, HARQ retransmission implementations and rules, format of a HARQ retransmission packet may not be defined. How to specify the protocol, or schedule for HARQ retransmissions is an open problem for the WiFi system which operates on a CSMA/CA basis. Also the physical layer processing for retransmission in a WiFi network is not optimized for HARQ based retransmission. In order to have better performance/decoding latency, it is desirable to optimize the physical layer processing for retransmissions for HARQ based retransmission. Optimizations may include methods to increase frequency/spatial diversity, reduce latency, or minimize signaling overhead.

A frame aggregation scheme may be provided. For example, one or more MAC service data units (MSDUs) may be aggregated to form an aggregated MSDU (A-MSDU). One or more MAC protocol data units (MPDUs) may be aggregated together to form an aggregated MPDU (A-MPDU). One or more physical layer service data units (PSDUs) may be aggregated together to form an aggregated PSDU (A-PSDU). When multiple PSDUs are aggregated together, e.g., if a single PHY header is mistakenly received, then each of the following PSDUs in the same A-PSDU may not be properly received. HARQ schemes in case of frame aggregation may be provided. LDPC codes in WLAN systems may be provided that may work with chase combining (CC) based HARQ operations, incremental redundancy (IR) based HARQ operations, and/or with HARQ with frame aggregation.

In HARQ combining, errors based on collisions may be distinguished from errors based on noise and/or interference. Combining information from packets that may have errors based on collisions may result in worse performance than the ones where no HARQ is used. A mid-segment may be used, which may enable the receiver to identify whether an error is based on collision or not. The mid-segment may be a repeat of a PLCP header (e.g., an existing PLCP header) with the same and/or different MCS as the original header. The mid-segment may be a repeat of the PLCP header with the L-STF, L-LTF and an HARQ SIG frame (e.g., a new HARQ SIG frame) including information such as the length to the next mid-segment, the retransmission number, and/or the code redundancy version, a combination of the L-STF and L-LTF, and/or a blank period of no transmission.

A receiver may use the mid-amble to estimate a collision metric. The collision metric may be used, for example, when the transmission fails. The receiver may be able to identify if the failure is due to a collision or a noise and/or interference. The receiver may feed this information back to the transmitter. The transmitter may use the information to improve the CSMA/CA multiple access parameters.

Collision metrics may provide information including, for example, change in interference/noise estimates, inability to decode PLCP information in the SIG, LLR statistics in the decoder, etc. Using the change in interference/noise estimates, if the interference or noise estimate changes drastically between mid-segments, the receiver may imply that there was a collision. Using the inability to decode PLCP information in the SIG, if the SIG decoding fails, the receiver may decide that there has been a collision. Using the LLR statistics in the decoder, if the LLR statistics undergoes an abrupt change, the receiver may decide that there was a collision.

A receiver may send an ACK (e.g., a partial ACK) to a transmitter to indicate the failure of a mid-segment. When a STA joins a network it may indicate support for mid-segment collision detection capabilities, which the STA may exchange with a BSS. An AP may send the mid-segment parameters to the STA. The mid-segment parameters may include the number of mid-segments (e.g., if the number of mid-segments is more than one). The mid-segment parameters may further include a mid-segment timing/interval. This interval may be a fixed value, estimated (e.g., implicitly estimated) based on the number of mid-segments and the length of the packet, and/or a value that may be signaled to the receiver at the start of a packet through a HARQ SIG.

A transmitter may acquire a channel (e.g., based on contention or deterministically) and may send information to a receiver. The receiver may decode the information. If the information is decoded correctly, the session may end. If the information is decoded incorrectly, the receiver may estimate the collision metric based on the mid-segment method(s) available. The receiver may use multiple collision metric estimators to minimize the probability of false alarm. The receiver discards the information, for example, when a collision may occur. The receiver may combine the information with subsequent HARQ transmissions, for example, when a noise and/or interference based failure may occur. The receiver may feedback the collision status to the transmitter, e.g., to facilitate a HARQ retransmission, and/or assist in fine-tuning the collision avoidance mechanism of the transmitter and/or the network. Frame aggregation, e.g., as described herein, may be used to identify collisions by the FCS in each PSDU.

Figure 12:
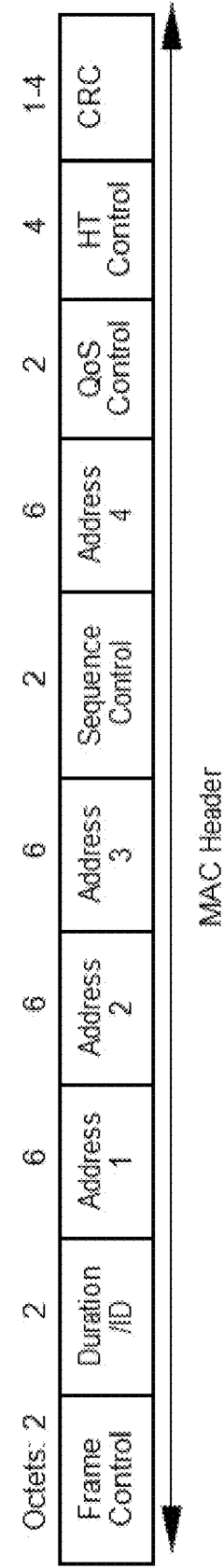
FIG. 12 depicts an exemplary MAC header with a cyclic redundancy check (CRC) field.

A MAC header design that may be robust and/or decodable independent of the data may be provided. Such a design may allow intended receivers of retransmitted packet to reliably combine one or more transmissions of the same data packet. A MAC header may have a maximum of 36 bytes. In a MAC data frame, the MAC header may followed by data bytes and a frame check sequence (FCS) of 4 bytes that may be used to determine if the MAC header and data bytes are received correctly. An additional CRC of 1-4 bytes may be added to the end of the MAC header. FIG. 12 illustrates such a MAC header with a CRC field (e.g., 1 to 4 bytes long) appended the end of the MAC frame. The presence of the CRC field may be signaled by using combinations of reserved bits in the frame control field for each of the one or more (e.g., four) possible frame types. The CRC may be derived by puncturing (e.g., appropriately puncturing) a CRC (e.g., a current CRC) or by using a different generator polynomial. Instead of a CRC, a byte-error correcting code (e.g., a Reed-Solomon code) may be used by shortening a code (e.g., an existing code). Such a code may enable error correction and/or detection.

In some systems, a MAC header may be transmitted using the same MCS as the data. A separate MCS for a MAC header may be provided. A MAC header may have the same code rate but may have a lower modulation mode than the data. The lower modulation mode than data may provide added robustness to the MAC header. The information of the different modulation mode may be indicated as an offset from the data modulation, e.g. one mode below the data. For example, if data is sent with 64 QAM, the MAC header may be sent with 16 QAM, using the same code rate. The MAC header may be zero-padded to make up an integral number of OFDM symbols, e.g., depending on the bandwidth mode. The MAC header may have both different code rate and modulation mode as compared to the data. This information about different code rate and modulation may be indicated as offset from the data MCS, e.g. the MAC header MCS may be specified to be one below that of the data. The MAC header may be zero-padded to make up an integral number of OFDM symbols, depending on the bandwidth mode.

Termination of MAC header convolution code may be provided. A MAC header may be terminated by one or more (e.g., six) additional zero-bits so that the trellis may be terminated at the end of the MAC header. This may allow the MAC header to be decoded as a block code and may provide additional robustness to the decoding.

LDPC coding for MAC header may be provided. For example, LDPC code of rate 1/2 with information bit length of 324 as the smallest codeword may be used. The MAC header, e.g., at 36 bytes, may have 288 bits. With an added CRC and/or zero-padding, the MAC header may be coded with rate 1/2 LDPC. This may allow the MAC header to be decoded independent of the data, and, may provide extra robustness.

A SIG field with MAC header information may be provided. The SIG filed may be located in the PHY layer. Since the SIG field may be transmitted with the lowest MCS, some information in the MAC header may be extracted to form an additional SIG field; examples of information that may be extracted include: TX addresses, RX addresses, sequence control fields, etc. This SIG field may be coded with rate 1/2 convolution code or LDPC codes as described herein.

HARQ retransmission procedures may be provided. A WiFi system may operate on an un-licensed band, and, interference from WiFi systems or non-WiFi systems may corrupt the WiFi transmissions, e.g., due to bad channel condition, collision with interference signals, etc. When there has been a HARQ transmission collision, the receiver may ignore the corrupted transmission and may not try to combine it with other received packet. It may be the receiver that makes the decision whether to apply HARQ combining. Each HARQ transmission may need to be self-decodable. Self-decodable HARQ implementations for WiFi systems may be provided, e.g., for Type I, II, and III as disclosed herein.

In a type I HARQ, HARQ transmission and retransmission(s) may have the same MCS level, e.g., they may use the same coding rate and/or modulation scheme. In this case, chase combining may be utilized at receiver side. In a type II HARQ, HARQ transmission and retransmission(s) may have the same coding scheme with the same coding rate, but may have different modulation schemes. At receiver side, a LLR combine may be applied on the receiver side. For example, the LLR combine may be applied after de-mapper and de-interleaver.

In a type III HARQ, HARQ transmission and retransmission(s) may have the same low data rate mother code, but may have different puncture schemes. At receiver side, a HARQ combining may be implemented by rebuild the set received coded bits. The rebuild coded bits may come from both HARQ transmission and retransmissions and the size of rebuild coded bits may be larger than each individual HARQ transmission or retransmission.

One or more types of HARQ schemes may be signaled in SIG field such that the receiver may choose the way to decode the packet with or without HARQ combining. HARQ transmission or retransmission may be signaled (e.g., explicitly signaled) in a SIG field.

In WiFi systems, one or more transmission and retransmission schemes may be allowed, e.g., one or more of the following. HARQ transmissions with one or more spatial streams (e.g., different spatial streams) may be allowed. For example, the first transmission may be with two data stream, while the HARQ retransmission may be with one data stream. The first transmission may be with STBC, while the HARQ retransmission may be without STBC. HARQ transmission with different bandwidths may be allowed. For example, the first transmission may be with 20 MHz, while the HARQ retransmission may be with 40 MHz.

Hybrid ARQ system may combine a received packet with the previous transmissions, such that time diversity may be achieved. By modifying the transmitter for HARQ retransmission, or providing one or more schemes for one or more HARQ transmissions, time diversity, spatial diversity, and/or frequency diversity may be provided.

Cyclic shift diversity (CSD) Design for HARQ Retransmission may be provided. CSD may be introduced in WiFi system for multiple antenna transmissions. The cyclic shift may be fixed. For example, Table 1 illustrates cyclic shift values of HT portion of packet.

TABLE 1

$T_{CS}^{iSTS}$ values for HT portion of packets

| Number of space-time | Cyclic shift for space-time stream 1 (ns) | Cyclic shift for space-time stream 2 (ns) | Cyclic shift for space-time stream 3 (ns) | Cyclic shift for space-time stream 4 (ns) |
|---|---|---|---|---|
| 1 | 0 | — | — | — |
| 2 | 0 | — | — | — |
| 3 | 0 | −400 | −200 | — |
| 4 | 0 | −400 | −200 | −600 |

With HARQ retransmission, the cyclic shift values for each space-time stream or transmit chain may be redesigned. For example, the order of the cyclic shift values for each stream may be changed or the values may be changed directly. In order to perform this, the first HARQ transmission, second transmission and so on may be signaled in the SIG field. The cyclic shift values for HARQ retransmission(s) may be pre-defined and/or broadcasted, e.g., in a Beacon frame. This processing may be transparent to receiver, and, the receiver may apply HARQ combining normally.

STBC Design for HARQ retransmission may be provided. STBC may be utilized in WiFi systems. For example, STBC may be used after the constellation mapper and before the CSD. One STBC mapping may be used for the first transmission and odd number of HARQ retransmission(s), and another STBC mapping may be used for the even number of HARQ retransmission(s). For example, the STBC mapping for the odd number of HARQ (re)transmission(s) may utilized the mapping provided in FIG. 13, while the STBC mapping for the even number of HARQ retransmission(s) may be redefined. FIG. 13 illustrates an example of STBC mapping for HARQ transmissions for two spatial time streams and 1 data stream case. Other STBC mapping may be possible. The receiver may be provided with the STBC mapping for a HARQ (re)transmission. The STBC mapping may be pre-defined (e.g., explicitly in a standard).

Spatial mapping for HARQ retransmission may be provided. Spatial mapping may be defined in WiFi system, e.g., after CSD block and before IDFT. A spatial mapping and/or steering matrix Q may be applied on the multiple spatial time streams out of CSD processing block, e.g., to convert them into multiple transmission chains. The Q matrix may be defined per sub-carrier, per multiple sub-carriers or per frequency channel. The size of Q matrix may be N_TX× N_STS.

Q matrix may vary from one transmission to other. It may not be necessary that the Q matrix on a certain sub-carrier remain the same for HARQ retransmission. A WiFi device may use the same method to calculate the Q matrix for HARQ retransmission and another Q matrix (e.g., new Q matrix) may be highly correlated with the Q matrix for HARQ transmission, e.g., if channel variation from the original transmission to retransmission is small. With HARQ transmission the Q matrix for the HARQ retransmission may be modified, e.g., such that the spatial diversity may be better achieved. For example, a simple column permutation of Q matrix may be applied for HARQ retransmission(s). This processing may be transparent to receiver, and the receiver may apply HARQ combining normally.

Timestamp design for HARQ retransmission may be provided. Timestamp of the previous HARQ transmission may be indicated in the HARQ retransmission, such that the receiver may know whether it may combine the current received frame with previously received and/or saved frame. The timestamp may be indicated in a SIG field of HARQ retransmission frame and/or a MAC header of HARQ retransmission frame. A Timestamp field (e.g., as defined in 802.11-2012 standard) may be used. The Timestamp field may represent the value of the timing synchronization function (TSF) of a frame source. The length of the Timestamp field may be eight octets.

Figure 14:
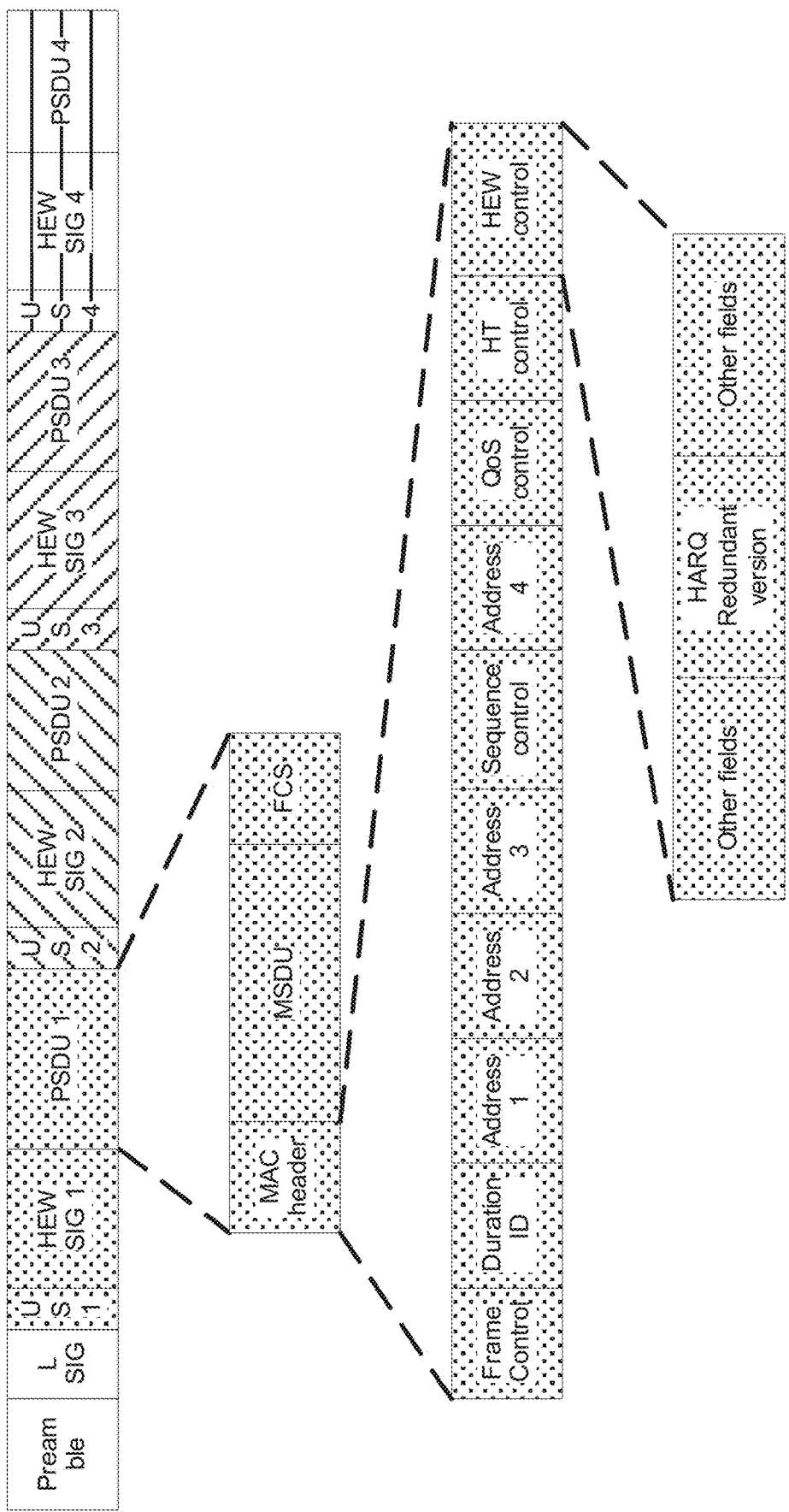
FIG. 14 depicts an exemplary Physical Layer Service Data Unit (PSDU) aggregation supporting HARQ.

PSDU frame aggregation with HARQ may be provided. FIG. 14 illustrates an example of PSDU aggregation supporting HARQ. Aggregation may be of two types: MSDU aggregation and MPDU aggregation. In MSDU aggregation, one or more MSDUs may be aggregated together to form a single large MSDU. The aggregated MSDU may be placed into a single MPDU. The single MPDU may include a single MPDU header and a single FCS. The entire MSDU be retransmitted, for example, when the FCS of the MPDU fails.

In MPDU aggregation, one or more MPDUs may be aggregated to form a single PSDU, where each MPDU may include may include a separate MPDU header and a separate FCS. Some FCSs may pass FCS checking and some other FCSs may not. For the FCSs that do not pass the FCS checking, the receiver may ask for retransmission of the corresponding MSDUs. A MPDU delimiter may be used to separate adjacent MPDUs For MPDU aggregations, a single PSDU may be encoded with a single encoder, using a single interleaver. The single PSDU may be punctured, e.g., using a single puncturing pattern, and may be mapped, e.g., using a single constellation. As illustrated in FIG. 14, one or more PSDUs may be aggregated together.

After the PHY preamble and the legacy SIG period (L-SIG), multiple PSDUs may be transmitted one after another, with each PSDU preceded by its HEW SIG segment and a different user-dependent sequence (US). The user-dependent sequence may be used to signal the user for which a PSDU (e.g., the following PSDU) may be intended. The corresponding receiver may detect its sequence, for example, by using a correlator, and may proceed to receiving the corresponding HEW SIG period and PSDU.

The HEW SIG may be received with an error. For example, in a PSDU aggregation without the user-dependent sequence before the HEW SIG, if one HEW SIG is received in error, the following user may not be able to figure out where his own PSDU may start and thus may not be able to receive its own PSDU. As described herein, this problem may be solved by introducing the user-dependent sequence, where a following user may be able to figure out where its own PSDU starts, even when an earlier users HEW SIG may be received in error. Each user may not need to detect and decode other user's SIG field in order to detect and decode its own information data.

Figure 15:
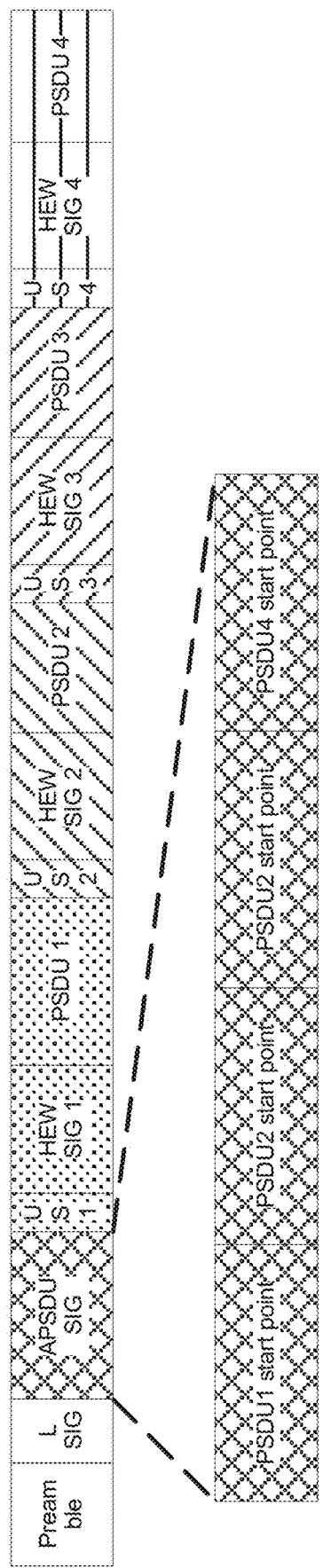
FIG. 15 depicts an exemplary aggregated PSDU (A-PSDU) SIG field.

FIG. 15 illustrates an example of an A-PSDU SIG. As illustrated in FIG. 15, an A-PSDU SIG field may be introduced in the beginning of the frame that may comprise the starting point for each PSDU within the frame. If the A-PSDU SIG field is received, the STA may be able to find its own PSDU irrespective of how other PSDUs may be transmitted.

Instead of signaling the redundancy version in the MAC header, a transmitter may signal the RV by using one or more (e.g., different) sequences in the user-dependent sequence. For example, if each user has up to three redundancy version in the encoding/puncturing process, each user may be allocated three unique sequences. A receiver, upon detecting the sequence may identify whether the sequence belongs to the receiver. If the sequence belongs to the receiver, the receiver may determine which redundancy version may be used for the PSDU transmission.

Figure 16:
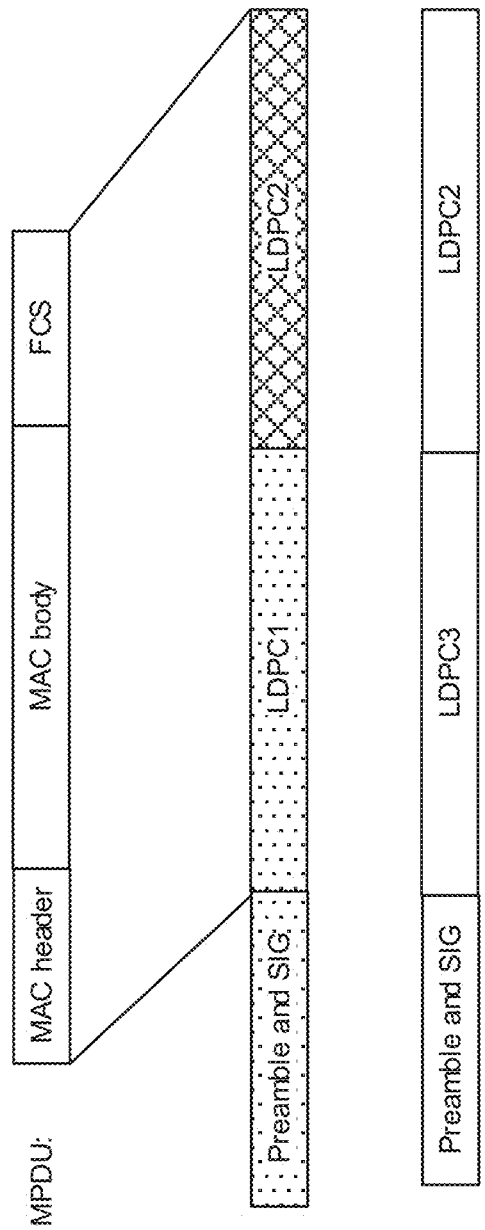
FIG. 16 depicts an exemplary HARQ retransmission with partial low-density parity check (LDPC) code words.

As illustrated in FIG. 16, the transmitter may start an A-PSDU transmission including one or more PSDUs. Each of the PSDU may be encoded separately. The MAC header of each individual PSDU may include a high efficiency WiFi (HEW) control field, which may include a FEC redundancy version (RV) information subfield. The redundancy version (RV) information subfield may indicate to the receiver which redundancy version of the encoder output is being used for the current PSDU. The receiver may use RV for decoding. The AP may use different RVs to encode and/or puncture different PSDUs. The RV information may be indicated in the HEW SIG field.

Upon receiving the A-PSDU packet, each receiver may send an ACK frame. The ACK frames may be sent one after another, or sent together, if multiple ACK transmission is enabled. The receiver may clearly acknowledge correct reception of the PSDU, e.g., by setting ACK/RV equal to 1, e.g., if the users PSDU is correctly received. The receiver may request re-transmission of the same PSDU using a same RV or a different RV, e.g., if the users PSDU is not correctly received. Upon receiving the ACK/RV frame, the transmitter may re-transmit the incorrectly received PSDUs using a same or a different RV.

One or more parity matrices (e.g., used for current 802.11 systems) may be defined for rate 1/2, 2/3, 3/4 and 5/6. These codes may not be rate-compatible. Rate compatible LDPC codes may be obtained by puncturing a base quasi cyclic parity matrix. Different code rates may be obtained by changing the size of the circulants. An interleaver may be used to improve performance.

If an interleaver is used, it may be formed based on the puncturing order. The coded sequence may be interleaved and the redundancy version may be defined based on interleaved and coded sequence. If Interleaver is not used, the order of bit puncturing may be designed to achieve better error correction performance in average for each of the code 4 rates (e.g., 1/2, 2/3, 3/4 and 5/6) for each size (e.g., 648, 1296 and 1944 bits). The redundancy version may be defined based on the puncturing order.

One or more code-rates may be obtained by methods defined for turbo codes. For example, Mother 1/3 LDPC code may be is defined, which may include 1/3 systematic (S) bits and 2/3 parity bits. The parity bits may be divided in two parts, e.g., a part P1 of 1/3 bits, and a part P2 of 1/3 bits. The S, P1, and P2 bits may be interleaved using an interleaver. For example, block interleaver or other interleavers may be used. The interleaving may result in $\pi$ (S), $\pi$ (P1), and $\pi$ (P2) as outputs. The resulting $\pi$ (S), $\pi$ (P1), and $\pi$ (P2) outputs may and put it in a circular buffer. The outputs $\pi$ (P1) and $\pi$ (P2) may be interlaced. A starting point (e.g., different starting point) may be used to read from the circular buffer. This may indicate different redundancy versions.

Using the same base code for 1/3 LDPC, different code rates may be generated. Any other rate may be used for mother code. Changing the rate may change the number of parity bits and the length of circular buffer.

In case the QC base matrix or circular buffer is used to generate rate-compatible LDPC, the payload may be divided in to one or more code-words, e.g., by using an algorithm (e.g., provided in IEEE 802.11n/ac standard).

Single payload may be divided into one or more LDPC codewords. When the FCS of the MAC frame fails, it may not mean that each of the code-words of LDPC failed. If during the ACK/NACK receiver signals, which code-words were decoded successfully, overhead of transmitting them again may be saved. Parity structure of LDPC may be used to check the codewords that may be decoded successfully. Same or different RVIDs may be used for retransmission of the multiple code-words. The RVIDs may be signaled in the SIG field as described herein. The RVIDs may be part of MAC header.

LDPC for frame aggregation may be provided. LDPC codes may be used in conjunction with the PSDU frame aggregation as described herein. PSDU for each user may be coded with LDPC with same or different redundancy version. RVID used for each PSDU may be included in A-PSDU SIG field. RVID may be signaled (e.g., implicitly) using one or more user-dependent sequences (US) for each RVID and/or each PSDU.

One MAC frame with one or more LDPC codewords may be provided. A MAC frame may be encoded with one or more LDPC codewords (e.g., three LDPC codeword lengths are specified in 802.11ac). At the decoder whether the LDPC code is decoded successfully may be known as the LDPC is a parity coding scheme. It may be possible to successfully decode one or more of the LDPC codewords, e.g., even if the final FCS may fail. A HARQ retransmission may be designed in such a way that the correctly decoded part of the frame may not be retransmitted.

FIG. 16 illustrates an example of an HARQ retransmission with partial LDPC codewords used from the first transmission. As illustrated in FIG. 15, the original MPDU, which may be composed of MAC header, MAC body, and FCS field, may be encoded with two LDPC codewords. The MAC header may be encoded in the first LDPC codeword, LDPC1. The PPDU may be transmitted to a receiver. The receiver may detect the preamble and SIG field correctly, and may decoded LDPC1 successfully, but the final FCS may fail, e.g., if LDPC2 may not be decoded correctly.

The receiver may retrieve MAC header information from LDPC1, and may feedback a special ACK fame to the transmitter, asking the transmitter to retransmit the LDPC2. The transmitter may acquire the media again and may perform the transmission to the receiver. The transmitter may encode a new MAC header with new data to LDPC3 and may concatenate LDPC2 as a new PPDU and transmit it to the receiver.

The MAC header may comprise information for HARQ, which may comprise one or more of the following: TX MAC address, RX MAC address, HARQ process ID for current transmission, HARQ process ID for retransmission, LDPC codeword index for retransmission, LDPC codeword index for current transmission, LDPC codeword lengths, etc. The LDPC codeword index for retransmission may be used to indicate the location of the LDPC codeword(s) in the previous HARQ transmission. LDPC codeword index for current transmission index may be used to indicate the location of the LDPC codeword(s) in current transmission. This index may be used by the ACK frame following this transmission to signal which LDPC codeword may be retransmitted. Retransmission indication for each LDPC codewords field may indicate whether the LDPC codeword is for retransmission or new transmission. LDPC codeword lengths field may indicate the codeword length of each LDPC codeword other than the first one. The first LDPC codeword length may be indicated in the SIG field.

What is claimed is:

1. A method for use in a first station, the method comprising:
   receiving a first transmission from a second station, wherein the first transmission comprises a first data packet and an indication that the first transmission is intended for the first station; and
   sending a second transmission to the second station, wherein the second transmission comprises an aggregated packet that includes at least one of an acknowledgement (ACK) frame, negative acknowledgement (NACK) frame, or a second data packet, wherein:
   the aggregated packet is different than the first data packet,
   on a condition that the first data packet was received correctly, the aggregated packet includes the ACK frame indicating a positive acknowledgement that does not elicit a retransmission of the first data packet from the second station, and
   on a condition that the first data packet was not received correctly, the aggregated packet includes the NACK frame indicating a negative acknowledgement that elicits a retransmission of the first data packet from the second station.

2. The method of claim 1, further comprising, sending the second transmission after determining that the first transmission is for the first station and that the first data packet cannot be decoded.

3. The method of claim 1, wherein the first transmission further comprises an indication of how many times the first data packet has been transmitted.

4. The method of claim 1, further comprising:
   receiving a NACK frame from the second station, wherein the NACK frame relates to the second data packet; and
   sending a third transmission comprising a second aggregated packet, wherein the third transmission uses a redundancy version.

5. The method of claim 4, further comprising:
   maintaining a counter associated with a HARQ process relating to the third transmission; and
   when an ACK frame or a NACK frame has not been received before the counter expires, retransmitting the redundancy version of the third transmission.

6. The method of claim 1, wherein one or more of a TXVector or an RXVector used by the first station include at least one of: a HARQ transmission parameter, a HARQ type parameter, a redundancy version parameter, or a HARQ process ID.

7. The method of claim 1, wherein the first transmission and the second transmission comprise an 802.11 message exchange.

8. The method of claim 1, wherein the second transmission further comprises an indication of how many times the second data packet has been transmitted.

9. A first station comprising:
   a processor;
   a receiver; and
   a transmitter,
   the processor and the receiver configured to receive a first transmission from a second station, wherein the first transmission comprises a first data packet and an indication that the first transmission is intended for the first station; and
   send a second transmission to the second station, wherein the second transmission comprises an aggregated packet that includes at least one of an acknowledgement (ACK) frame, negative acknowledgement (NACK) frame, or a second data packet, wherein:
   the aggregated packet is different than the first data packet,
   on a condition that the first data packet was received correctly, the aggregated packet includes the ACK frame indicating a positive acknowledgement that does not elicit a retransmission of the first data packet from the second station, and
   on a condition that the first data packet was not received correctly, the aggregated packet includes the NACK frame indicating a negative acknowledgement that elicits a retransmission of the first data packet from the second station.

10. The first station of claim 9, wherein the processor and the transmitter are further configured to send the second transmission after determining that the first transmission is for the first station and that the first data packet cannot be decoded.

11. The first station of claim 9, wherein the first transmission further comprises an indication of how many times the first data packet has been transmitted.

12. The first station of claim 9, wherein the processor and the receiver are further configured to receive a NACK frame from the second station, wherein the NACK frame relates to the second data packet, and the processor and the transmitter are further configured to send a third transmission comprising a second aggregated packet, wherein the third transmission uses a redundancy version.

13. The first station of claim 12, wherein the processor is further configured to:

maintain a counter associated with a HARQ process relating to the third transmission; and when an ACK frame or a NACK frame has not been received before the counter expires, retransmit the redundancy version of the third transmission.

14. The first station of claim 9, wherein one or more of a TXVector or an RXVector used by the first station include at least one of: a HARQ transmission parameter, a HARQ type parameter, a redundancy version parameter, or a HARQ process ID.

15. The first station of claim 9, wherein the first transmission and the second transmission comprise an 802.11 message exchange.

16. The first station of claim 9, wherein the second transmission further comprises an indication of how many times the second data packet has been transmitted.

* * * * *